(12) United States Patent
Gu et al.

(10) Patent No.: US 12,198,042 B2
(45) Date of Patent: Jan. 14, 2025

(54) BINARY NEURAL NETWORK BASED CENTRAL PROCESSING UNIT

(71) Applicant: NORTHWESTERN UNIVERSITY, Evanston, IL (US)

(72) Inventors: Jie Gu, Evanston, IL (US); Tianyu Jia, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 885 days.

(21) Appl. No.: 17/347,233

(22) Filed: Jun. 14, 2021

(65) Prior Publication Data
US 2021/0390383 A1 Dec. 16, 2021

Related U.S. Application Data

(60) Provisional application No. 63/039,192, filed on Jun. 15, 2020.

(51) Int. Cl.
*G06F 15/78* (2006.01)
*G06N 3/04* (2023.01)
*G06N 3/065* (2023.01)

(52) U.S. Cl.
CPC ........ *G06N 3/065* (2023.01); *G06F 15/7867* (2013.01); *G06N 3/04* (2013.01)

(58) Field of Classification Search
None
See application file for complete search history.

(56) References Cited

U.S. PATENT DOCUMENTS

2018/0121796 A1* 5/2018 Deisher ................. G10L 15/16

OTHER PUBLICATIONS

Otseidu, Kofi et al., "Design and Optimization of Edge Computing Distributed Neural Processor for Biomedical Rehabilitation with Sensor Fusion," International Conference on Computer-Aided Design (ICCAD), Nov. 2018, 8 Pages.
Blaauw, D. et al., "IoT Design Space Challenges: Circuits and Systems," Symposium on VLSI Technology Digest of Technical Papers, 2014, 2 Pages.
Whatmough, Paul N. et al., "A 28nm SoC with a 1.2GHz 568nJ/ Prediction Sparse Deep-Neural-Network Engine with >0.1 Timing Error Rate Tolerance for IoT Applications," IEEE International Solid-State Circuits Conference, Feb. 2017, 3 Pages.
Hempstead, Mark et al., "An Ultra Low Power System Architecture for Sensor Network Applications," Proceedings of the 32nd International Symposium on Computer Architecture (ISCA'05), 2005, 12 Pages.
(Continued)

*Primary Examiner* — Scott C Sun
(74) *Attorney, Agent, or Firm* — Benesch Friedlander Coplan & Aronoff LLP

(57) ABSTRACT

Systems and methods for a unified reconfigurable neural central processing unit is provided. In one aspect, a neural central processing unit is in communication with a memory, wherein the neural central processing unit is configured to transition between a binary neural network accelerator mode and a central processing unit mode, wherein, in the binary neural network accelerator mode, the memory is configured as an image memory and weight memories, wherein, in the central processing unit mode, the memory is reconfigured, from the image memory and the weight memories, to a data cache.

20 Claims, 19 Drawing Sheets

(56) References Cited

OTHER PUBLICATIONS

Sridhara, Srinivasa R. et al., "Microwatt Embedded Processor Platform for MedicalSystem-on-Chip Applications," IEEE Journal of Solid-State Circuits, vol. 46, No. 4, Apr. 2011, 10 Pages.
Shi, Yao et al., "A 10mm3 Syringe-Implantable Near-Field Radio System on Glass Substrate," IEEE International Solid-State Circuits Conference, Feb. 2016, 3 Pages.
Chen, Tianshi et al., "DianNao: A Small-Footprint High-Throughput Accelerator for Ubiquitous Machine-Learning," International Conference on Architectural Support for Programming Languages and Operating Systems (ASPLOS), Mar. 2014, 15 Pages.
Chen, Yu-Hsin et al., "Eyeriss: A Spatial Architecture for Energy-Efficient Dataflow for Convolutional Neural Networks," ACM/IEEE 43rd Annual International Symposium on Computer Architecture, Jun. 2016, 13 Pages.
Jouppi, Norman P. et al., "In-Datacenter Performance Analysis of a Tensor Processing Unit," International Symposium on Computer Architecture (ISCA), Jun. 2017, 12 Pages.
Desoli, Giuseppe et al., "A 2.9TOPS/W Deep Convolutional Neural Network SoC in FD-SOI 28nm for Intelligent Embedded Systems," IEEE International Solid-State Circuits Conference, Feb. 2017, 3 Pages.
Online Resource, Intel, "Neural Compute Engine: Hardware Based Acceleration for Deep Neural Networks", https://www.movidius.com/MyriadX.
Song, Jinook et al., "An 11.5TOPS/W 1024-MAC Butterfly Structure Dual-Core Sparsity-Aware Neural Processing Unit in 8nm Flagship Mobile SoC," IEEE International Solid-State Circuits Conference, Feb. 2019, 3 Pages.
Karnik, Tanay et al., "A cm-Scale Self-Powered Intelligent and Secure IoT Edge Mote Featuring an Ultra-Low-Power SoC in 14nm Tri-Gate CMOS," IEEE International Solid-State Circuits Conference, Feb. 2018, 3 Pages.
Honkote, Vinayak et al., "A Distributed Autonomous and Collaborative Multi-Robot System Featuring a Low-Power Robot SoC in 22nm CMOS for Integrated Battery-Powered Minibots," IEEE International Solid-State Circuits Conference, Feb. 2019, 3 Pages.
Han, Song et al., "Deep Compression: Compressing Deep Neural Networks With Pruning, Trained Quantization and Huffman Coding," International Conference on Learning Representations (ICLR), May 2016, 14 Pages.
Howard, Andrew G. et al., "MobileNets: Efficient Convolutional Neural Networks for Mobile Vision Applications," arXiv preprint arXiv:1704.04861v1, 2017, 9 Pages.
Han, Song et al., "EIE: Efficient Inference Engine on Compressed Deep Neural Network," ACM/IEEE 43rd Annual International Symposium on Computer Architecture, Jun. 2016, 12 Pages.
Parashar, Angshuman et al., "SCNN: An Accelerator for Compressed-sparseConvolutional Neural Networks," International Symposium on Computer Architecture (ISCA), Jun. 2017, 14 Pages.
Moons, Bert et al., "ENVISION: A 0.26-to-10TOPS/W Subword-Parallel Dynamic-Voltage-Accuracy-Frequency-Scalable Convolutional Neural Network Processor in 28nm FDSOI," IEEE International Solid-State Circuits Conference, Feb. 2017, 3 Pages.
Ueyoshi, Kodai et al., "QUEST: A 7.49TOPS Multi-Purpose Log-Quantized DNN Inference Engine Stacked on 96MB 3D SRAM Using Inductive-Coupling Technology in 40nm CMOS," IEEE International Solid-State Circuits Conference, Feb. 2018, 3 Pages.
Abadi, Martin et al., "TensorFlow: Large-Scale Machine Learning on Heterogeneous Distributed Systems," arXiv preprint arXiv:1603.04467v2, Mar. 2016, 19 Pages.
Narayanan, Deepak et al., "Accelerating Deep Learning Workloads through Efficient Multi-Model Execution," NeurJPS Workshop on Systems for Machine Learning, Dec. 2018, 8 Pages.
Wu, Carole-Jean et al., "Machine Learning at Facebook: Understanding Inference at the Edge," IEEE International Symposium on High Performance Computer Architecture (HPCA), Feb. 2019, 14 Pages.

Sridhara, Srinivasa R., "Ultra-Low Power Microcontrollers for Portable, Wearable, and Implantable Medical Electronics," Asia and South Pacific Design Automation Conference (ASP-DAC), Jan. 2011, 5 Pages.
Bol, David et al., "A 25MHz 7 µW/MHz Ultra-Low-Voltage Microcontroller SoC in 65nm LP/GP CMOS for Low-Carbon Wireless Sensor Nodes," IEEE International Solid-State Circuits Conference, Feb. 2012, 3 Pages.
Online Resource, Nvidia, "Embedded Systems for Next-Generation Autonomous-Machines", https://www.nvidia.com/en-us/autonomous-machines/embedded-systems/.
Online Resource, Google, "Edge TPU", https://cloud.google.com/edge-tpu/.
Hill, Mark D. et al., "Amdahl's Law in the Multicore Era," Computer, vol. 41, No. 7, Jul. 2008, 6 Pages.
Esmaeilzadeh, Hadi et al., "Dark Silicon and the End of Multicore Scaling," International Symposium on Computer Architecture (ISCA), Jun. 2011, 12 Pages.
Zhang, Jintao et al., "In-Memory Computation of a Machine-LearningClassifier in a Standard 6T SRAM Array," IEEE Journal of Solid-State Circuits, vol. 52, No. 4, Apr. 2017, 10 Pages.
Jiang, Zhewei et al., "XNOR-SRAM: In-Memory Computing SRAM Macro for Binary/Ternary Deep Neural Networks," IEEE Symposium on VLSI Technology Digest of Technical Papers, Jun. 2018, 2 Pages.
Eckert, Charles et al., "Neural Cache: Bit-Serial In-Cache Acceleration of Deep Neural Networks," ACM/IEEE 45th Annual International Symposium on Computer Architecture, Jun. 2018, 14 Pages.
Graves, Alex et al., "Neural Turing Machines," arXiv preprint arXiv:1410.5401v2, 2014, 26 Pages.
Graves, Alex et al., "Symbolic Reasoning with Differentiable Neural Computers," Nature, vol. 538, Oct. 2016, 64 Pages.
Jang, Hanhwi et al., "MnnFast: A Fast and Scalable System Architecture for Memory-Augmented Neural Networks," International Symposium on Computer Architecture (ISCA), Jun. 2019, 14 Pages.
Stevens, Jacob R. et al., "Manna: An Accelerator for Memory-Augmented Neural Networks," IEEE/ACM International Symposium on Microarchitecture (MICRO), Oct. 2019, 13 Pages.
Trask, Andrew et al., "Neural Arithmetic Logic Units," arXiv preprint arXiv:1808.00508v1, Aug. 2018, 15 Pages.
Chen, Chixiao et al., "Exploring the Programmability for Deep Learning Processors: from Architecture to Tensorization," Design Automation Conference (DAC), Jun. 2018, 6 Pages.
Putic, Mateja et al., "DyHard-DNN: Even More DNN Acceleration with Dynamic Hardware Reconfiguration," Design Automation Conference (DAC), Jun. 2018, 6 Pages.
Hubara, Itay et al., "Binarized Neural Networks," Advances in Neural Information Processing Systems (NIPS), Dec. 2016, 9 Pages.
Ando, Kota et al., "BRein Memory: A Single-Chip Binary/TernaryReconfigurable in-Memory Deep Neural Network Accelerator Achieving 1.4 TOPS at 0.6 W," IEEE Journal of Solid-State Circuits, vol. 53, No. 4, Apr. 2018, 12 Pages.
Bankman, Daniel et al., "An Always-On 3.8 ÂµJ/86% CIFAR-10Mixed-Signal Binary CNN Processor With All Memory on Chip in 28-nm CMOS," IEEE Journal of Solid-State Circuits, vol. 54, No. 1, Jan. 2019, 15 Pages.
Khwa, Win-San et al., "A 65nm 4Kb Algorithm-Dependent Computing-in-Memory SRAM Unit-Macro with 2.3ns and 55.8TOPS/W Fully Parallel Product-Sum Operation for Binary DNN Edge Processors," IEEE International Solid-State Circuits Conference, Feb. 2018, 3 Pages.
Park, Jeongwoo et al., "A 65nm 236.5nJ/Classification Neuromorphic Processor with 7.5% Energy Overhead On-Chip Learning Using Direct Spike-Only Feedback," IEEE International Solid-State Circuits Conference, Feb. 2019, 3 Pages.
Waterman, Andrew et al., "The RISC-V Instruction Set Manual, vol. I: User-Level ISA, Document Version 2.2," RISC-V Foundation, May 2017, 145 Pages.

(56) References Cited

OTHER PUBLICATIONS

Keller, Ben et al., "A RISC-V Processor SoC With Integrated Power Management at Submicrosecond Timescales in 28nm FD-SOI," IEEE Journal of Solid-State Circuits, vol. 52, No. 7, Jul. 2017, 13 Pages.

Guthaus, Matthew R. et al., "MiBench: A Free, commercially representative embedded benchmark suite," IEEE International Workshop on Workload Characterization, 2001, 12 Pages.

Mishiba, Kazu et al., "Image Resizing With Sift Feature Preservation," IEEE International Conference on Image Processing (ICIP), 2013, 5 Pages.

Mitianoudis, Nikolaos et al., "Multi-Spectral Document Image Binarization Using Image Fusion and Background Subtraction Techniques," IEEE International Conference on Image Processing (ICIP), 2014, 5 Pages.

Demirovic, Damir et al., "Performance of some image processing algorithms in TensorFlow," International Conference on Systems, Signals and Image Processing (WSSIP), 2008, 4 Pages.

Atzori, Manfredo et al., "Building the NINAPRO Database: A Resource for the Biorobotics Community," IEEE International Conference on Biomedical Robotics andBiomechatronics (BioRob), Jun. 2012, 8 Pages.

\* cited by examiner

Out = Sign($\sum W*A+B$)

|  | ISSCC'17 [2] | ISSCC'19 [43] | ISSCC'18 [40] | ISSCC'18 [41] | This Work |
|---|---|---|---|---|---|
| Process | 28nm | 65nm | 65nm | 28nm | 65nm |
| Architecture | FC+CPU | FC | BNN | BNN | NCPU |
| NN Model | 8-bit FC | 8-bit FC | FC BNN | Conv BNN | FC BNN |
| Dataset | MNIST | MNIST | MNIST | CIFAR-10 | MNIST |
| Accuracy | 98.36% | 98.06% | 90.1% | 86.05% | 94.8% |
| Frequency | 667MHz | 20MHz | 400MHz | 10MHz | 18-960MHz |
| Voltage | 0.9V | 0.8V | 1V | 0.8V | 0.4-1V |
| BNN Power | 33.7mW | 23.6mW | 0.6W | 0.9mW | 24.1mW (1.0V) 1.2mW (0.4V) |
| Efficiency | 1.2TOPs/W | 3.42TOPs/W | 6.0TOPs/W | 0.53TOPs/W | 1.6TOPs/W (1.0V) 6.0TOPs/W (0.4V) |

FIG. 9

BINARY NEURAL NETWORK BASED CENTRAL PROCESSING UNIT

CROSS-REFERENCE TO RELATED APPLICATIONS

The present application claims the benefit of priority under 35 U.S.C. § 119 from U.S. Provisional Patent Application Ser. No. 63/039,192 entitled "Binary Neural Network Based Central Processing Unit," filed on Jun. 15, 2020, the disclosure of which is hereby incorporated by reference in its entirety for all purposes.

STATEMENT OF FEDERALLY FUNDED RESEARCH OR SPONSORSHIP

This invention was made with government support under grant number NSF-1618065 awarded by the National Science Foundation. The government has certain rights in the invention.

TECHNICAL FIELD

The present disclosure generally relates to central processing units, and more specifically relates to binary neural network based central processing units.

BACKGROUND OF THE DISCLOSURE

Many emerging embedded applications such as the internet of things, sensor networks, and wearable devices suffer from extreme power and cost constraints. At the same time, machine learning inference has become an essential workload for both high performance data center and low power edge devices leading to the growing deployments of costly deep neural network accelerators in such platforms. Although there have been many strategies proposed to improve the power efficiency for standalone accelerators, the optimization for the end-to-end performance of a heterogeneous architecture is still challenging and often overlooked, especially for embedded low power devices.

The description provided in the background section should not be assumed to be prior art merely because it is mentioned in or associated with the background section. The background section may include information that describes one or more aspects of the subject technology.

SUMMARY

According to certain aspects of the present disclosure, a system is provided. The system includes a memory and a first layer in communication with the memory. The system includes an instruction cache in communication with the first layer. The system includes a second layer in communication with the first layer. The system includes a register file in communication with the first layer and the second layer. The system includes a third layer in communication with the first layer, the second layer, and the memory. The system includes a result memory in communication with the fourth layer, wherein, in a binary neural network accelerator mode, the memory is configured as an image memory and weight memories. In a central processing unit mode, the memory is reconfigured, from the image memory and the weight memories, to a data cache.

According to certain other aspects of the present disclosure, an edge device is provided. The edge device includes a memory and a neural central processing unit in communication with the memory. The neural central processing unit is configured to transition between a binary neural network accelerator mode and a central processing unit mode. In the binary neural network accelerator mode, the memory is configured as an image memory and weight memories. In the central processing unit mode, the memory is reconfigured, from the image memory and the weight memories, to a data cache.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF DRAWINGS

The disclosure is better understood with reference to the following drawings and description. The elements in the figures are not necessarily to scale, emphasis instead being placed upon illustrating the principles of the disclosure. Moreover, in the figures, like-referenced numerals may designate to corresponding parts throughout the different views.

FIG. 9 illustrates a comparison between the NCPU core performance with conventional neural network accelerators.

Figure 1A:
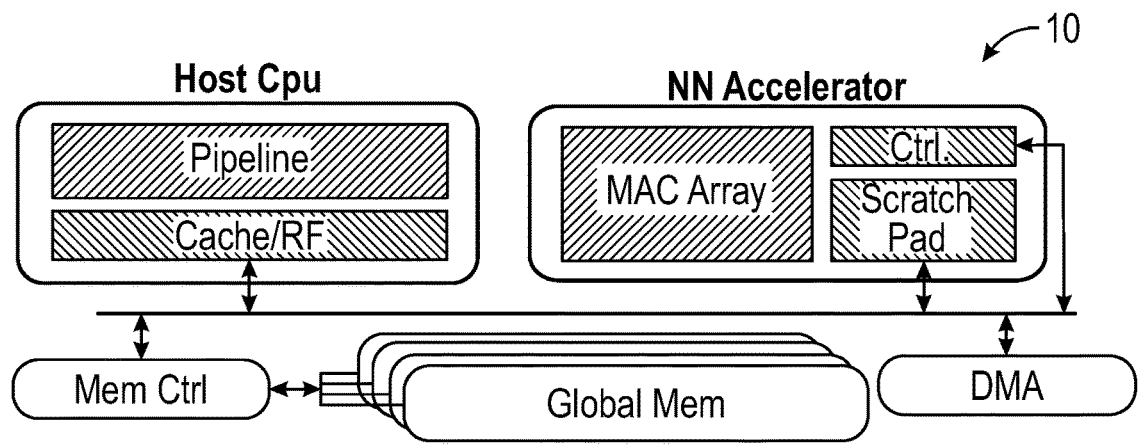
FIG. 1A illustrates a conventional heterogeneous system on a chip (SoC) with low core utilization.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The disclosed system provides for a unified reconfigurable architecture, referred to as a Neural CPU (NCPU), for low-cost embedded systems. In certain aspects, the architecture is built on a binary neural network accelerator with the capability of emulating an in-order RISC-V CPU pipeline. The NCPU core supports flexible programmability of RISC-V and maintains data storage locally to avoid core-to-core data transfer. In certain aspects, the NCPU chip is designed and fabricated in a 65 nm CMOS technology. Compared with conventional heterogeneous architecture, the disclosed reconfigurable NCPU core achieves 35% area reduction while maintaining the same functionality, which is suitable for low power and low-cost embedded edge devices. In certain aspects, a two-core NCPU implementation achieves an end-to-end performance speed-up of 43% or equivalent 74% energy saving from the demonstrations on real-time image and motion detection use cases.

The disclosed system provides a reconfigurable architecture, which closes the significant design gap between the neural network accelerators and the conventional CPUs. In certain aspects, the architecture of the disclosed system (e.g., the NCPU) is reconfigured to perform either binary neural network (BNN) inference operation or RISC-V in-order CPU operation with a similar performance and programmability of each standalone architecture. Exemplary benefits of such architecture are not only a cost reduction for edge devices, but also higher core utilization and end-to-end performance. In certain aspects, the disclosed system is fabricated and tested using a 65 nm CMOS technology with the operating supply voltage from 1V down to ultra-low power regime of 0.4V delivering state-of-art efficiency of 6.0 TOPS/W. Compared with the conventional heterogeneous design that includes both the CPU and BNN accelerator, the single NCPU core achieves 35% area reduction while maintaining the functionality and efficiency of both, rendering significant cost advantages for use in resource-constrained embedded edge devices. In addition, compared with a conventional two-core heterogeneous design, in certain aspects of the disclosed system, two NCPU cores demonstrate 43% end-to-end performance improvement or equivalent 74% power saving using real-time image and motion detection demonstration cases.

In certain aspects, the reconfigurable NCPU architecture of the disclosed system leverages logics and memories inside neural network accelerator to recover capability of CPU pipeline operations. As a result, the single NCPU core can support both neural network inference and general-purpose CPU computing with efficiency similar as both architectures.

In certain aspects, NCPU architecture of the disclosed system is designed to fully support 32-bit RISC-V Base ISA. In certain aspects, a customized RISC-V instruction set extension is developed to incorporate BNN operations, data transferring and mode switching.

In certain aspects, a special zero-latency transition scheme is provided to support seamless switching between CPU and BNN modes.

In certain aspects, a two-NCPU core SoC architecture is designed and fabricated using 65 nm CMOS technology. The measured performance is compared with baseline conventional design. Real-life use cases on image and motion detections demonstrate the benefits of the architecture of the disclosed system in embedded systems.

FIG. 1A illustrates a conventional heterogeneous system on a chip (SoC) 10 with low core utilization. A growing gap is observed between the computing demand and the availability of hardware resources in low power embedded system. At one hand, the immense potential impact of ubiquitous computing is limited primarily by the power and cost constraints. Many emerging applications in Internet-of-Things (IoT) and sensor networks require energy-scavenging devices that need to perform critical measurement, computation, and communication tasks with the extremely limited and unpredictable power sources. Wearables and biomedical devices also suffer from the very tight constraints on power and cost. On the other hand, the blooming machine learning (ML) tasks, such as deep neural network (DNN), have become a widely deployed and often essential workload on systems from data center all the way down to low power mobile devices. Unfortunately, the resource demand from such ML applications is often prohibitively high for ultra-low-power low-cost embedded systems. Such a discrepancy between supply and demand in hardware space is calling for renewed considerations on architecture design to deliver an "affordable" computing power on resource constrained embedded systems.

The conventional Von-Neumann CPU architecture suffers from instruction overhead with the so-called Von-Neumann bottleneck. To support the heavy workload of ML tasks, the conventional microprocessor designs normally adopt a heterogeneous architecture which consists of both general-purpose processors, e.g. CPUs, and the special-purpose accelerators, such as the DNN accelerator, as shown in FIG. 1A. However, for resource-constrained embedded systems, e.g. smart sensors, micro drones which have limited form factors, a DNN accelerator core is often too expensive to be affordable due to its high consumption of power and area. For instance, in the industrial embedded or mobile SoCs, the neural network accelerator engine consumes a few times more area and power cost than a CPU core because the DNN accelerator requires a large number of MAC units and SRAM storage resources.

In addition to the power and area cost, the conventional heterogeneous architecture suffers from core under-utilization which could significantly degrade the execution latency for workloads and impact the user experience for real-time applications. Due to the unbalanced workload assignment between CPU and DNN accelerator, the end-to-end performance improvement offered from accelerators is quite limited. Several industrial design cases have illustrated the serious performance impact caused by the core under-utilization, i.e. the CPU data processing could take more than 60% runtime for various workloads, as shown in FIG. 1A. Although many schemes have been explored to improve the efficiency of standalone DNN accelerator from algorithm level, architecture level, or even down to circuit design level, there is limited optimization consideration at the architecture or system level for the end-to-end performance dealing with the imbalance among heterogeneous cores to improve the real-time workload latency.

As a result of the significant design cost and the core under-utilization challenges from the conventional DNN accelerators, a recent survey shows that the majority of mobile edge devices on the market are rely on CPU to process the machine learning inferences, even although there are dedicated accelerator or GPU designed inside the SoC. Accordingly, in certain aspects, the architecture of the disclosed system offers both general-purpose CPU operation and ML inference efficiently with high core utilization and sufficient flexibility for programming.

Figure 1B:
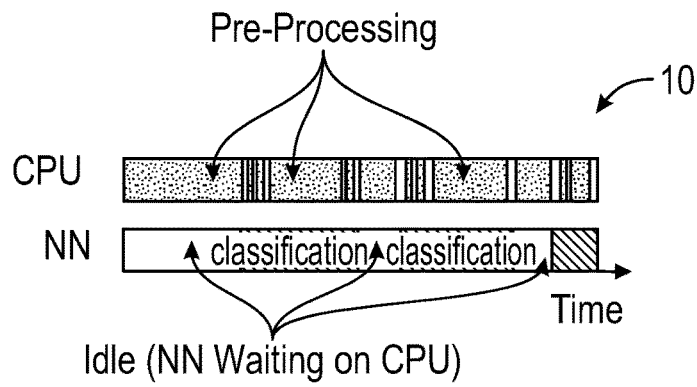
FIG. 1B illustrates timing aspects of the conventional heterogeneous SoC of FIG. 1A.

FIG. 1B illustrates the timing aspects of the conventional heterogeneous SoC 10 of FIG. 1A.

Figure 1C:
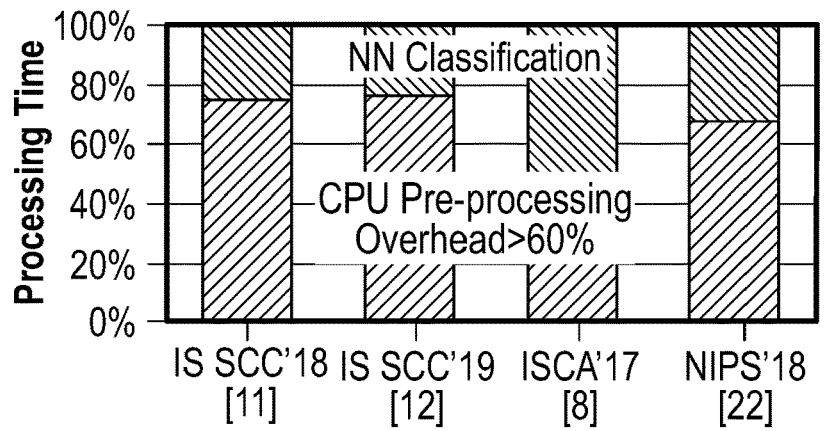
FIG. 1C illustrates additional timing aspects of the conventional heterogeneous SoC of FIG. 1A.

FIG. 1C illustrates additional timing aspects of the conventional heterogeneous SoC 10 of FIG. 1A.

Figure 1D:
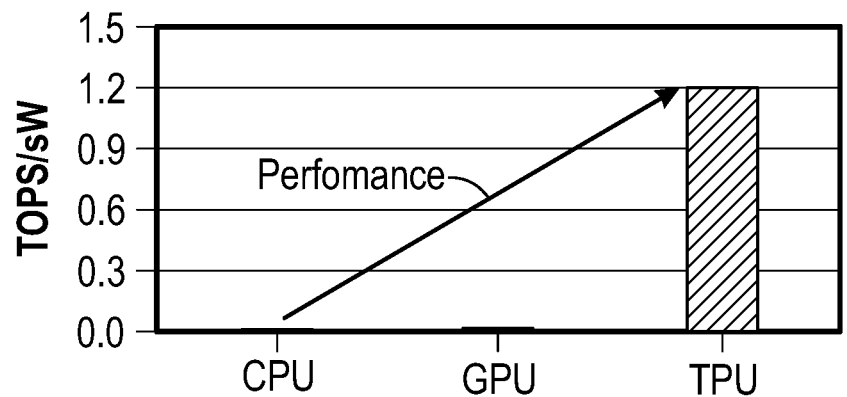
FIG. 1D illustrates a performance comparison of conventional heterogeneous SoCs in terms of power efficiency.

FIG. 1D illustrates a performance comparison of conventional heterogeneous SoCs in terms of power efficiency.

Figure 1E:
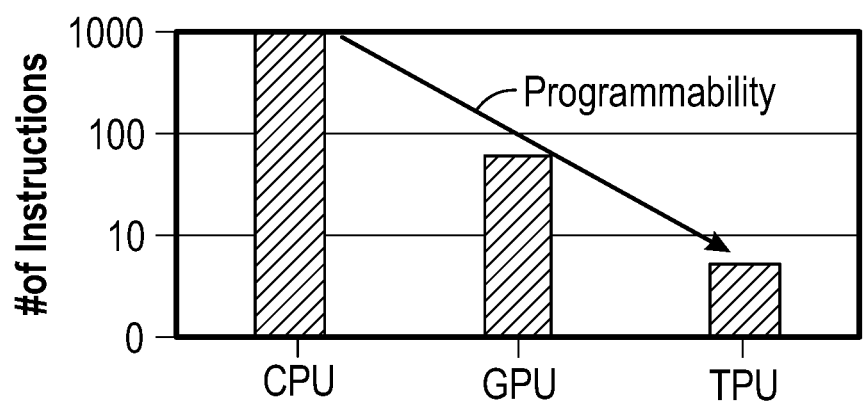
FIG. 1E illustrates a programmability comparison of conventional heterogeneous SoCs in terms of number of instructions.

FIG. 1E illustrates a programmability comparison of conventional heterogeneous SoCs in terms of number of instructions.

As described above, the conventionally resource constrained embedded SoC 10 has extreme low power and cost budgets for various applications, such as wearable devices, sensor network, or IoT devices. Previously, a lot of developments have been conducted focusing on improving the power efficiency of the standalone CPUs or microcontrollers. With the recent workload requirements for the machine learning applications, the support of DNN operation is becoming a critical requirement for embedded systems, with various industrial product examples. The conventional heterogenous SoC architecture that includes both CPU and DNN accelerator incurs several design challenges for the resource constrained embedded SoCs.

First of all, for example, the DNN accelerator core is expensive. For instance, in certain 16 nm ultra-low power embedded SoC, its neural accelerator engine consumes about same area cost compared with CPU core, delivering up to 1 TOPS performance for the neural network. To obtain better DNN performance, in certain other 8 nm mobile SoC, the area of its DNN accelerator is more than 2× larger than the host CPU, achieving peak 6.9 TOPS but consuming 39 mW even at 0.5V. As can be seen, for the resource constrained embedded SoC, the area and power of DNN accelerator is becoming a limiting factor for the adoption of such design.

Further, in such examples, the CPU still dominates end-to-end performance while the DNN accelerator core is often under-utilized. For example, in certain IoT edge SoC, the CPU operation for pre-processing takes 70 ms, while each feature classification in CNN accelerator only takes 5 ms. As a result, the CNN accelerator is only utilized at 24% runtime, while remaining idle at the rest of the time. Similarly, in other certain IoT edge SoC, the CPU data pre-processing time could take 67% runtime, which significantly impacts the workload end-to-end performance. Even in a better optimized systems, the CPU still occupies 30~40% of the total latency. As implied by Amdahl's Law, the optimizations focusing on standalone DNN accelerator itself is insufficient to improve the performance of the whole system. As discussed above, novel architecture design is needed to improve the end-to-end performance for the resource-constrained edge devices.

Previously, the traditional in-memory computing concept is to bring the neural network computation that happened inside the memory storage to reduce the data transfer cost. Certain conventional in-memory computing schemes can further support flexible ALU instructions, e.g. addition, reduction and the multiplications, in SRAM. However, these conventional schemes are often limited by the limited quantization levels, large process variations and the significant power cost from periphery circuits, e.g. ADCs.

The conventional Von Neumann architecture has dominated the microprocessor development in the past several decades due to its support of general-purpose computing. With reference to FIGS. 1D and 1E, the comparison of three such conventional architecture is provided in terms of power efficiency, defined as TOPS/s/W and programmability in terms of number of instructions. The conventional CPU processor has limited numbers of arithmetic logic unit (ALU) and needs to support flexible programming instructions. Hence the conventional CPUs suffer from limited performance and power efficiency. However, the CPU has highest programmability with the largest number of supported instructions. The GPU is able to integrate more than hundreds of ALUs into one streaming processor to achieve high computing parallelism. To further improve the performance and the power efficiency, various ASIC DNN accelerators have been developed with a large number of fixed functional units, e.g. MAC units and simple data steaming dataflows. However, the benefit of the Von Neumann architecture in general purpose computing is lost in the DNN accelerators.

As will be explained further below, the disclosed system takes a different design direction of the conventional flow of CPU to ASIC design migration. For example, the disclosed system, in certain aspects, uses an ASIC accelerator as a starting baseline architecture which maintains the highest efficiency for DNN operation. A CPU-like instruction support is added into the accelerator design to support the general-purpose computing with very small overhead. The benefit of such architecture is that it maintains the efficiency of the accelerator while still supporting the CPU operation leading to a low cost and high throughput architecture for embedded devices.

It should be understood that while conventional reconfigurable architectures have been proposed to add programmability into DNN accelerators, such conventional architectures focused on reconfiguring one design into various types of neural network operations, e.g., DNN, RNN. The disclosed system instead provides a design configurable between a CPU and a neural network accelerator as explained in more detail below.

Figure 2A:
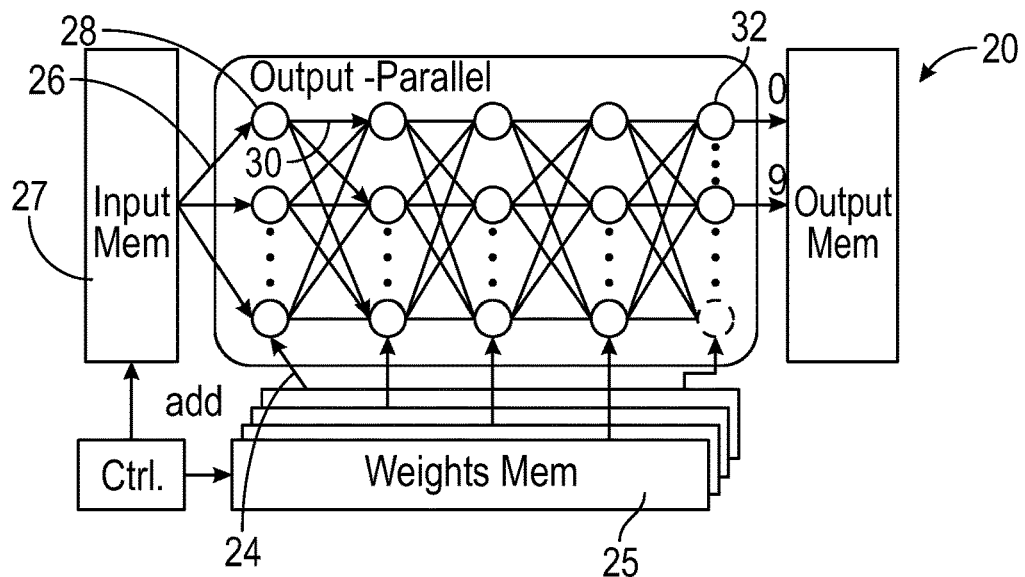
FIG. 2A illustrates a baseline binary neural network (BNN) accelerator architecture.
Figure 2B:
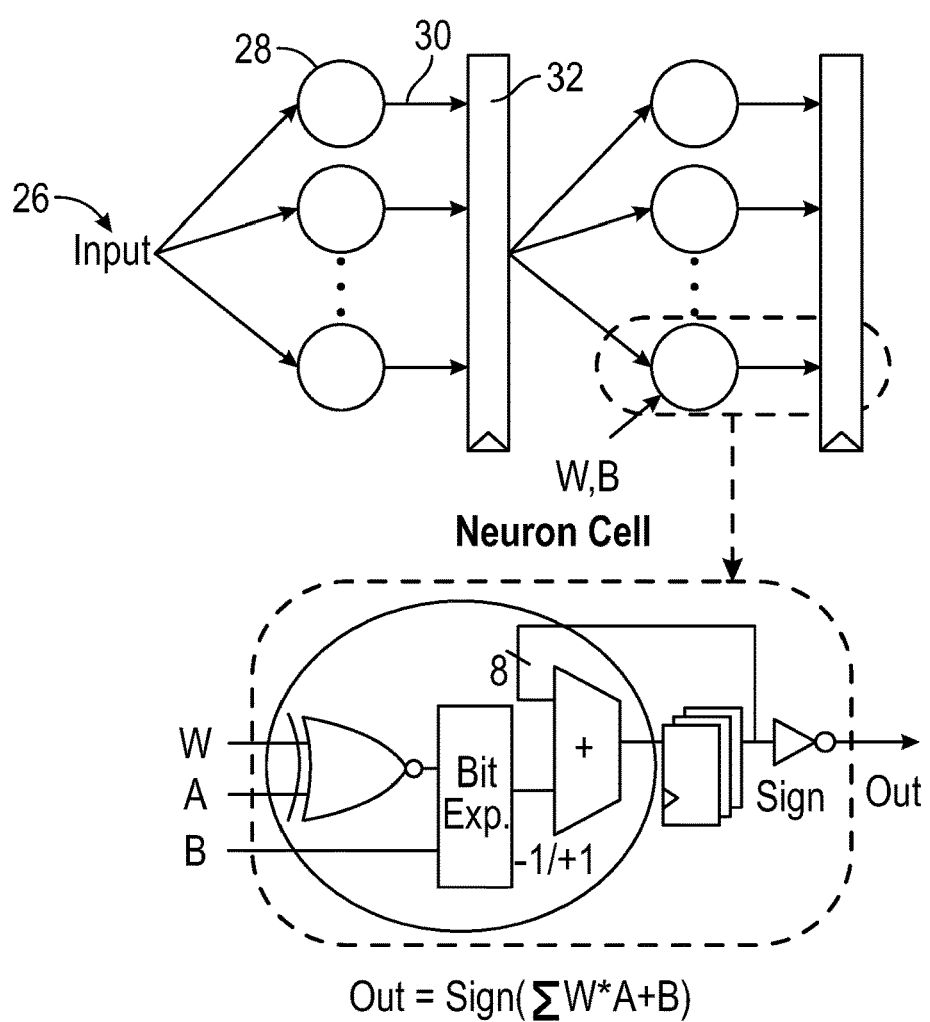
FIG. 2B illustrates an exemplary hardware implementation of a multi-layer BNN accelerator, such as the BNN accelerator of FIG. 2A, with details of an exemplary binary neuro cell.

FIG. 2A illustrates a baseline binary neural network (BNN) accelerator 20 architecture of an NCPU 22 (shown in FIG. 3A), according to certain aspects of the disclosure. FIG. 2B illustrates an exemplary hardware implementation of a multi-layer BNN accelerator, such as the BNN accelerator 20 of FIG. 2A, with details of an exemplary binary neuro cell. The BNN accelerator 20 is an attractive low-cost solution for low power embedded applications. For example, the BNN accelerator 20 constrains the weights 24 and inputs 26 to be only +1 and −1, which significantly reduces the weight memory cost with marginal degradation in accuracy. In certain aspects, the input 26 and weight 24 values are fetched directly from SRAM memory 27, 25, respectively, and sent to the XNOR neurons 28. The output value 30 of single neuron is shared to all the neurons at the following layer to increase the data parallelism. The pipelined multi-layer BNN is designed to propagate the input from left to right through all the layers and generate the final classification result 32 at the last layer.

With particular reference to FIG. 2B, the registers 32 in each neuron cell store the intermediate input values for the next network layer. This propagates different instructions in sequence till the last pipeline layer to commit.

Figure 3A:
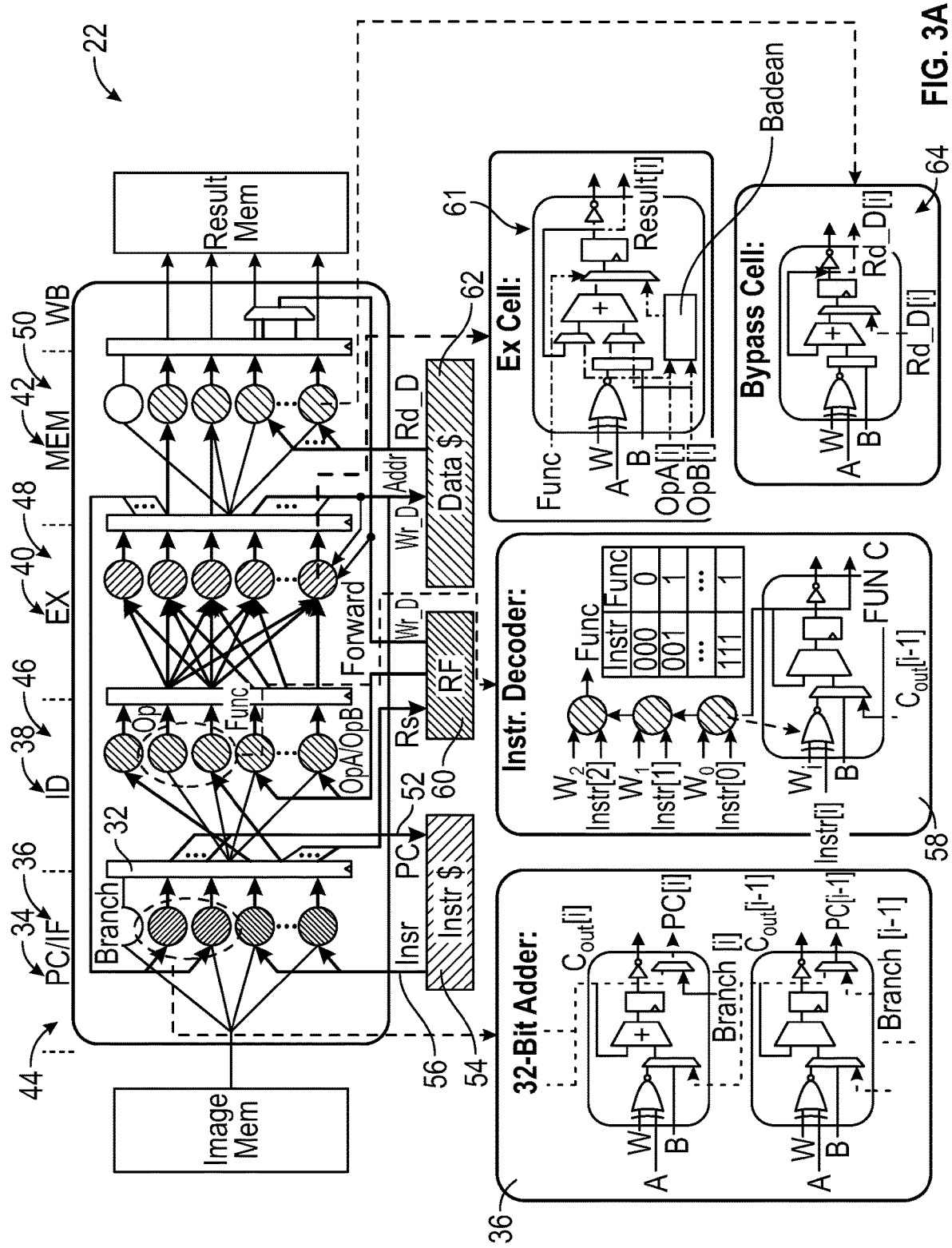
FIG. 3A illustrates a top-level architecture of a neural CPU (NCPU) depicting a data path at each pipeline stage.
Figure 3B:
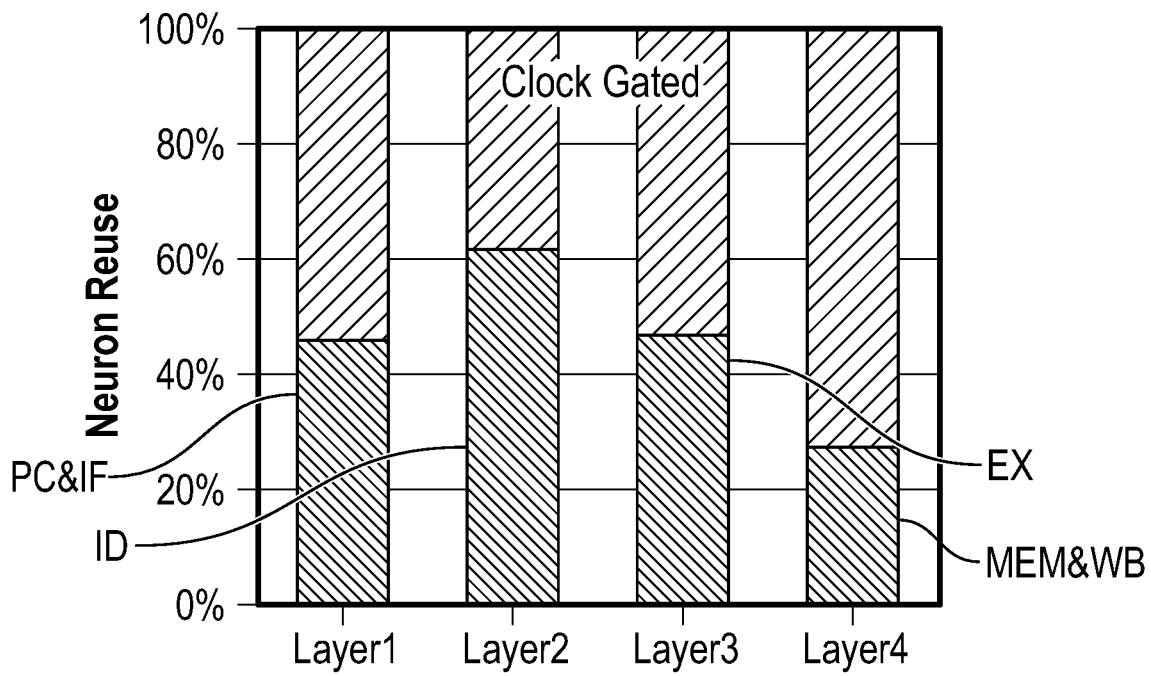
FIG. 3B illustrates neuron configuration rate of the NCPU of FIG. 3A.
Figure 3C:
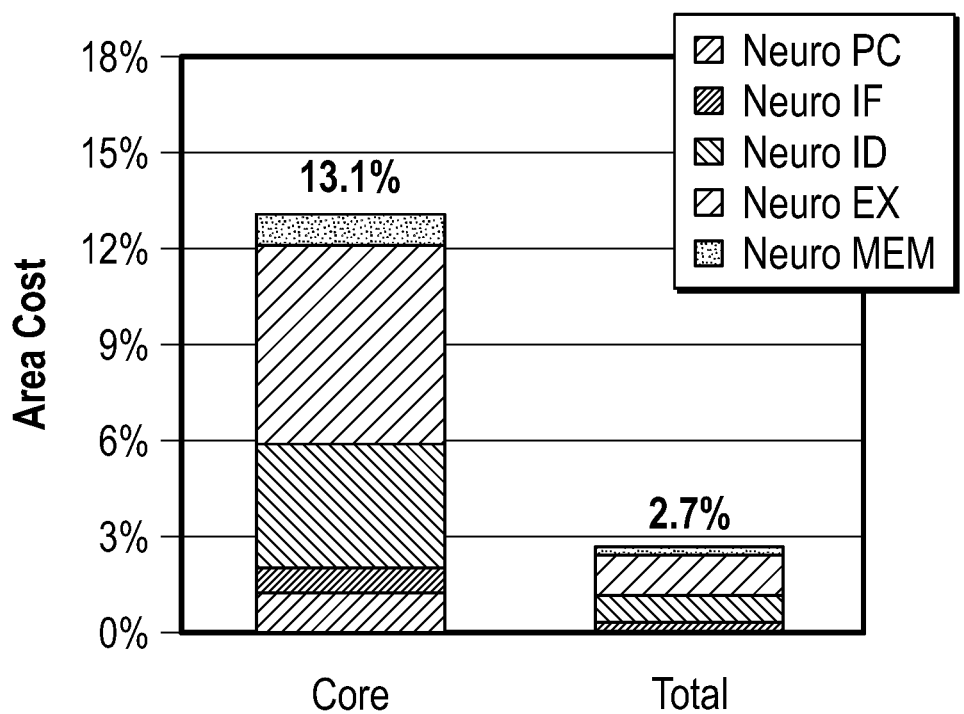
FIG. 3C illustrates area overhead of the NCPU of FIG. 3A, including the area overhead of the NCPU core excluding SRAM and the area overhead of the whole NCPU including SRAM.
Figure 3D:
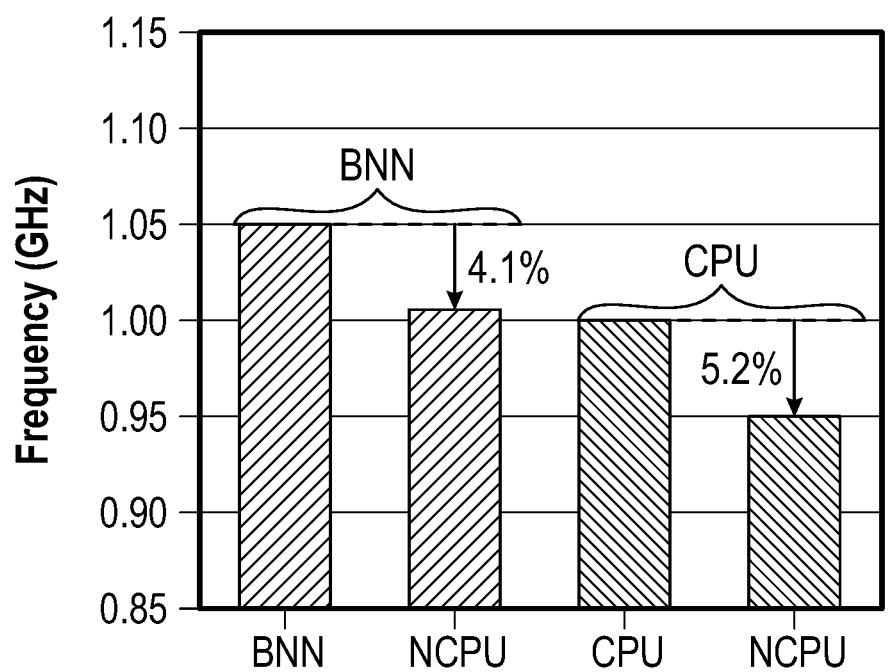
FIG. 3D illustrates performance impact of the NCPU of FIG. 3A compared with a standalone BNN accelerator and with a CPU core.

FIG. 3A illustrates a top-level architecture of the NCPU 22 depicting a data path at each pipeline stage, according to certain aspects of the disclosure. FIG. 3B illustrates neuron configuration rate of the NCPU 22 of FIG. 3A. FIG. 3C illustrates area overhead of the NCPU 22 of FIG. 3A, including the area overhead of the NCPU core excluding SRAM and the area overhead of the whole NCPU including SRAM. FIG. 3D illustrates performance impact of the NCPU 22 of FIG. 3A compared with a standalone BNN accelerator and with a CPU core. In certain aspects, an open-source RISC-V is used for suitability with ultra-low power embedded edge devices due to its simple pipeline structure, low power consumption, and high portability. The NCPU architecture recovers the full functionality of CPU pipeline on top of the baseline BNN accelerator by reconfiguring the existing logics and memory banks with very small hardware overhead. The RISC-V 32-bit Base Integer instruction set is used as the target ISA.

A four-layer 44, 46, 48, 50 neural network is provided as the baseline BNN accelerator to intentionally match 5-stage in-order RISC-V CPU pipeline. Each layer 44, 46, 48, 50 contains one hundred hardware neuron cells. In certain aspects, for more than four layers of BNN, the output layer results can be wrapped back to the first layer to process deeper neural network. A 5-stage in-order scalar pipeline, which is similar to the pipeline stages of the RISC-V Rocket scalar core, is fused into the BNN accelerator by modifying the data path and binary neuron of every layer. As a result, a neural pipeline is provided as a hardware emulator of the RISC-V CPU pipeline operations. The detailed implementations for each neuron layer 44, 46, 48, 50 and their reconfiguration capabilities are explained as the following.

Stage 1—NeuroPC: Program Counter

Similar to the conventional CPU pipeline, the first neural stage is used to emulate the program counter (PC) for fetching the incoming instruction. In the most cases, the PC stage 34 is only performing "+4" operation, which is an ADD operation. Therefore, 4 neuron cells are connected in series with the self-feedback at the last neuron to realize "+4". The existing adder 36 inside the neuron MAC is reused, with each neuron generating 8 bits of the PC. For supporting branch address coming from the following Execution stage 40, an additional mux is added for branch taken operation.

Stage 2—NeuroIF: Instruction Fetch

Partial of the first neural layer 44 is also reconfigured to emulate the CPU IF stage. As the PC address 52 is sent to the instruction cache 54, the instructions 56 are read out and stored. Therefore, the neuron cells are reconfigured similar as bypass cells, which pass the incoming values directly to the output. The registers inside the neuron cells at NeuroIF stage 36 are reused to store the fetched instructions, with only one additional mux to select the register data source.

Stage 3—NeuroID: Instruction Decode

The ID stage 38 decodes instructions into partial codes such as opcode, function code, register sources and destinations, etc. The binary neural network is utilized to realize the decoding function. To decode particular information, such as the op code, a group of three neuron cells 58 are combined along with the weights of neural network. As a result, a mapping between the instruction ISA and decoded opcodes, e.g. ADD, SUB are established using neural network operation. Both the adder 36 and registers 32 inside the neuron cells are reused to support CPU operation. In addition, the ID stage 38 also readout the operand values from the register file 60 and store them, which is similar as the bypass cell design at NeuroIF stage 36.

Stage—NeuroEX: Execution

The NeuroEX stage 40 emulates different arithmetic or Boolean operations as an ALU. As only adder and XOR gate existed inside the original BNN neuron cell, more Boolean logic gates 61 are added to recover the rest of ALU operations including AND, OR, etc. The CPU operations that require similar resources, e.g. ADD/SUB, LW/SW, are grouped and mapped into the same neuron cells, to reduce unnecessary activation of unused neurons. In addition, a multiplier is also realized at the Execution stages based on existing "adders" inside neurons. For some special CPU control data paths, such as branch checking and the operand forwarding, they are implemented by the conventional digital design to minimize the area overhead.

Stage 5—NeuroMEM: Memory Access

The functionality of the NeuroMEM stages 42 are mainly reading or writing the data from/to the data cache 62. Hence, the neuron cells 64 propagate results similar as the NeuroIF bypass neurons. Based on the opcode type, the read/write enable signals are sent to the data cache 62 for the memory operations, which will be discussed below. After NeuroMEM stage 42, the computation results are written back to the register file 60 based on the opcode to commit the instruction execution.

Figure 4A:
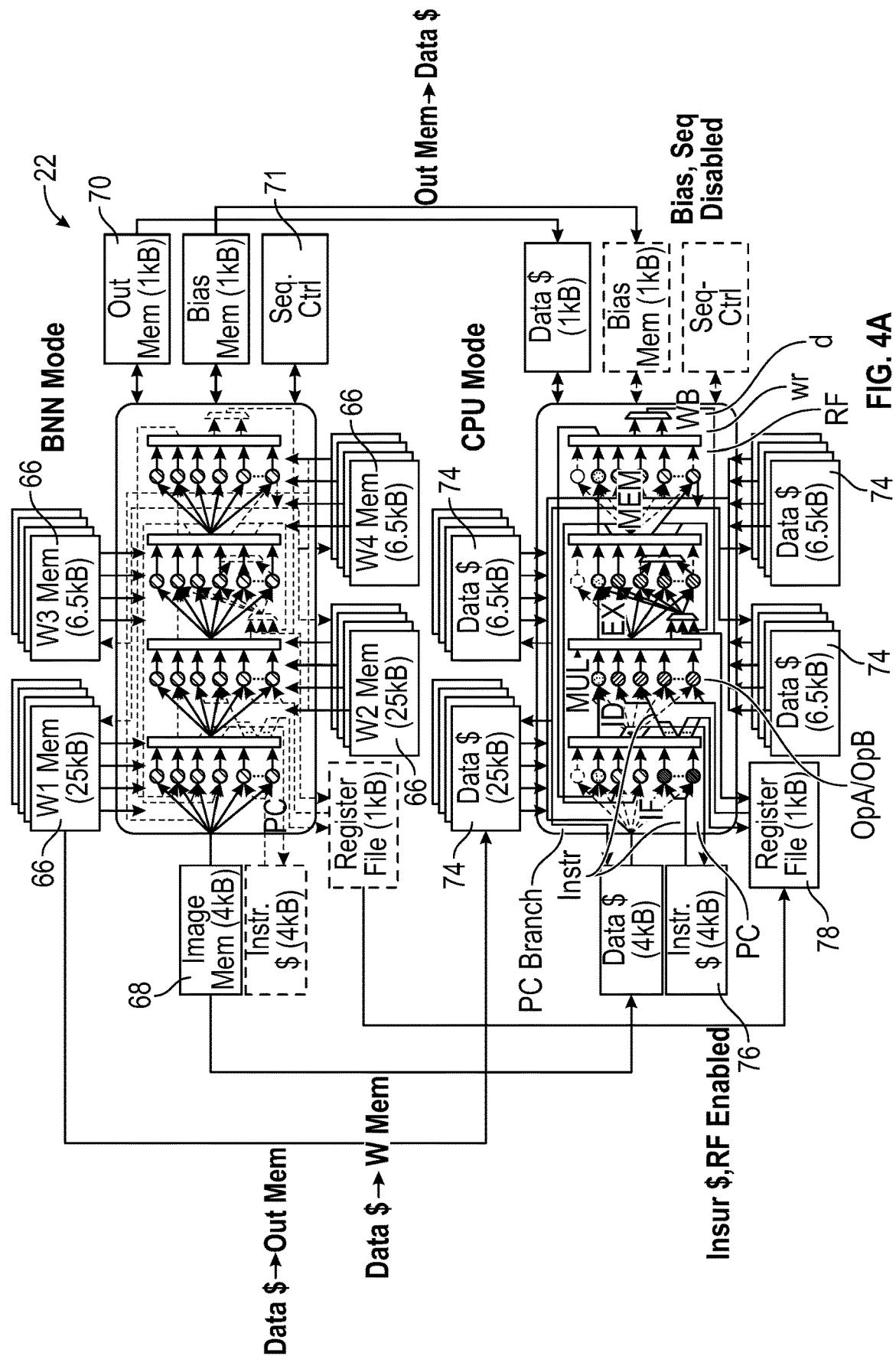
FIG. 4A illustrates memory and data path configuration schemes during a BNN accelerator mode and a CPU mode of the NCPU.
Figure 4B:
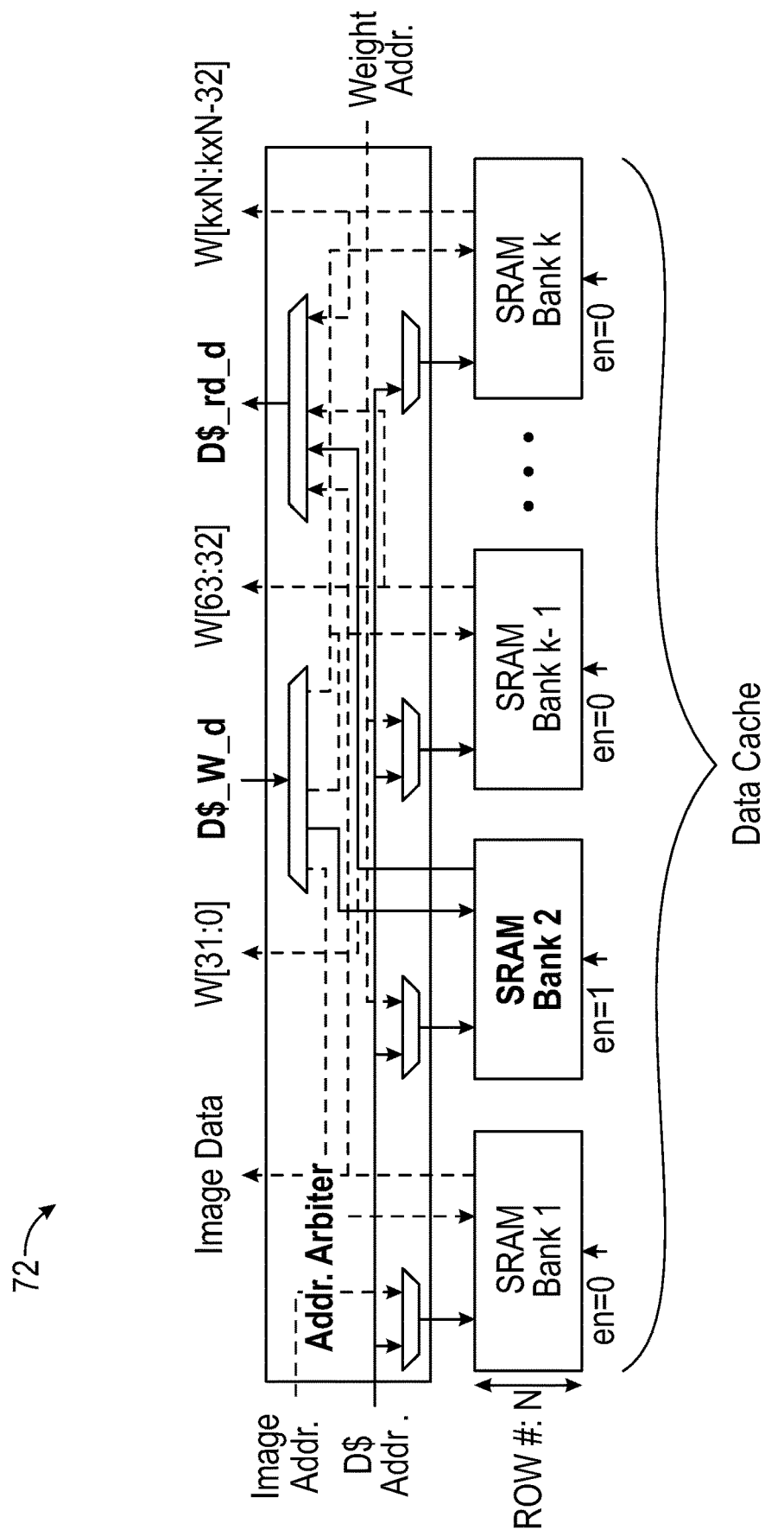
FIG. 4B illustrates an address arbiter design to support the memory configurations of FIG. 4A.

FIG. 4A illustrates memory and data path configuration schemes during a BNN accelerator mode and a CPU mode of the NCPU 22. FIG. 4B illustrates an address arbiter design to support the memory configurations of FIG. 4A. All 37 32-bit RISC-V base instructions and 5 additional customized instructions for BNN modes are supported in the NCPU design. The complete data paths under different operation modes are shown in FIG. 4A. During CPU mode, ab out half neuron cells are reconfigured. For example, ID stage 38 reuse about 63% neurons for CPU operation at layer2 46. For the rest unused neuron cells, clock gating is used to minimize the power overhead in CPU operation. With reference to FIGS. 3B-3D, the area overhead of the NCPU core excluding SRAM and the overhead of the whole NCPU including SRAM. Comparing with the baseline standalone BNN core, the area cost for realizing the NCPU pipeline stages excluding memory is 13.1%. Including both core and the SRAM memories, the overall area overhead of the NCPU design is only 2.7%. The NeuroEX stage 40 needs the most modifications, i.e. most area overhead, to recover the full functionality of the CPU ALU. The rest pipeline stages can better reuse the existing BNN accelerator logics and incurs less cost. Comparing with a standalone BNN accelerator or a CPU core, the performance of the NCPU core, i.e. maximum operation frequency, degrades only 4.1% and 5.2% for two operating modes, respectively.

Memory Reuse Scheme for NCPU

Beyond the reconfiguration of the core data path, to save the memory area, the on-chip SRAM memory for the BNN accelerator is also designed to be reused as data cache during CPU operation. The memory configuration during both operation modes is illustrated in FIG. 4A. In a BNN mode, multiple SRAM banks with 32-bit port are used to store all the BNN weights and its input image data. Each neuron layer has a group of memory banks 66 to store all the weights and support wide memory bandwidth. There is one dedicated image memory 68 to store the input values and one output memory 70 to store the classification results. The top-level sequence controller 71 is used to generate the unified SRAM address to all the weight memory banks and the sequence control configurations to manage the neural network process. During the BNN mode, all the weight memory banks 66 are enabled to support the max image classification throughput.

FIG. 4B illustrates an address arbiter design to support the memory configurations of FIG. 4A. When switched to a CPU mode, all weight memories 66 and the input image memories 68 are reused as the data cache 74. Separate instruction cache 76 and register file 78 are used to store the instruction programs and some initial data. For the data cache operation, an address arbiter 72 is used to enable only one SRAM bank out of all memory banks based on the target address for the read or write operation, as shown in FIG. 4B. The rest unused memory banks are clock gated to save the power overhead from the weight banks in BNN operation.

The reuse of SRAM banks for both operation modes not only significantly reduces the total memory need to support dual operations but also allows CPU/BNN output data to be stored locally without data transfer between the cores. For example, the CPU mode can pre-process initial data and store the results at the image memory (reconfigurable as the data cache). After completion of the CPU pre-processing, the NCPU switches to BNN mode and directly read the processed data from the image memory and proceed to the classification. Similarly, after the image classification from BNN operation, the NCPU can switch to CPU mode with the classification results directly read from the output memory reconfigured as the data cache. As a result, the data transfer among heterogeneous cores in conventional designs is eliminated.

Zero-Latency Switching Between Operation Modes

Figure 5A:
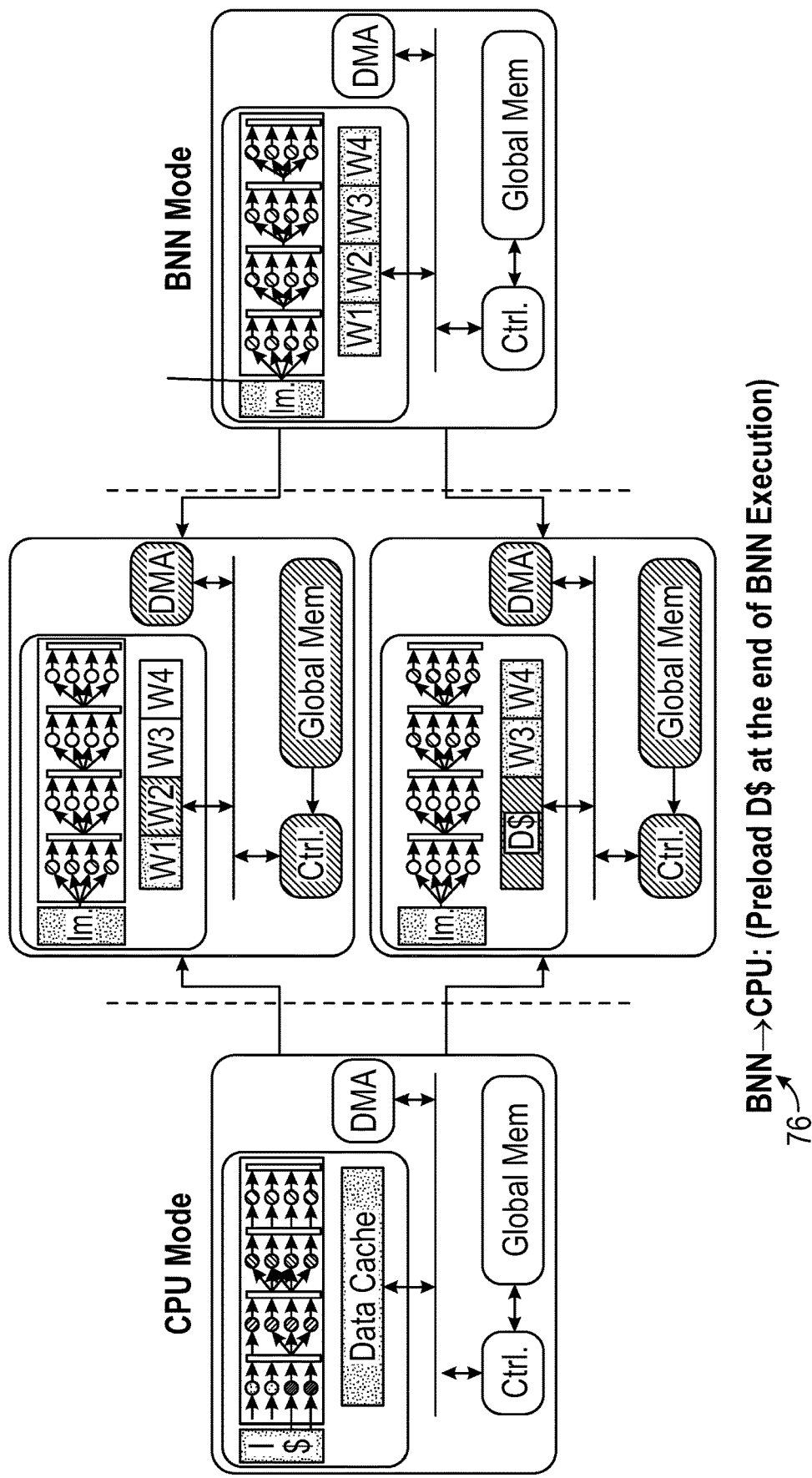
FIG. 5A illustrates operation mode switching between the BNN accelerator mode and the CPU mode with special data pre-loading sequences to achieve zero latency.

FIG. 5A illustrates operation mode switching between the BNN accelerator mode and the CPU mode with special data pre-loading sequences 76 to achieve zero latency. For small size neural network models, the weights stay statically inside the weight memory and the remaining weight and image memories serve as the data cache for CPU. Hence, no dynamic reconfiguration of SRAM is needed and the operation mode transition can be performed seamlessly. For the large size neural network models with weights fully occupying the weight memory, the data cache needs to be dynamically reconfigured into weight cache due to the large model size. As a result, the weights need to be loaded before transitioning into the BNN mode. For such situations, a zero-latency switching scheme is developed to eliminate latency impact during mode switching.

Figure 5B:
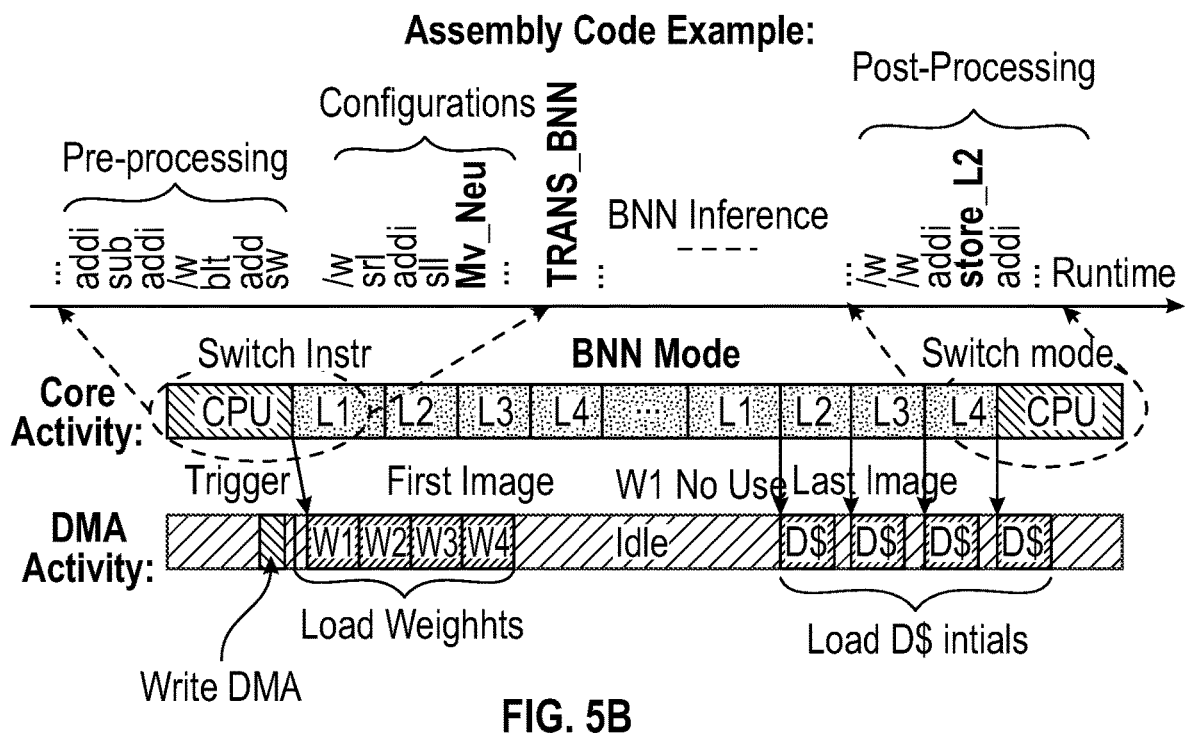
FIG. 5B illustrates example assembly code during workload runtime.

FIG. 5B illustrates example assembly code during workload runtime. To establish the zero-latency mode transition between RISC-V CPU operation and the BNN inference operation, a special mode transition sequence with a series of customized instructions is developed for the NCPU 22, as shown in FIG. 5B. The NCPU core stays in the CPU operation mode at beginning to perform general-purpose computation, such as data pre-processing, accelerator configuration calculation, etc. The processed image data is stored into the local image memory, and the accelerator configurations stores into special designed transition neuron cells. As the NCPU stores the preprocessed data locally, the data transfer in the conventional heterogenous architecture can be avoided.

For CPU to BNN mode transition, a customized RISC-V instruction Trans_BNN is used to switch core operation mode into BNN inference. To avoid the latency for the BNN inference, the weight values of the first neuron layer always reside at one of the weight memory banks. Hence the image inference can start immediately with the layer1 weights after the mode switching, while the weights for the following neuron layers are continuously loaded from the global memory to the local weight SRAM at the same time.

For the BNN to CPU mode transition, the CPU initial data is pre-loaded into data cache before the mode transition happen. While the last image of the image batches is being processed, the DMA engine already starts to load the CPU initial data into the data caches before all the BNN inference task complete. Hence no additional latency occurs during the NCPU operation mode switching. After the NCPU core switches back to the CPU mode, the PC of the instruction cache continues increasing to proceed the post-processing of the image classification results.

Customized RISC-V Extension

Figure 5C:
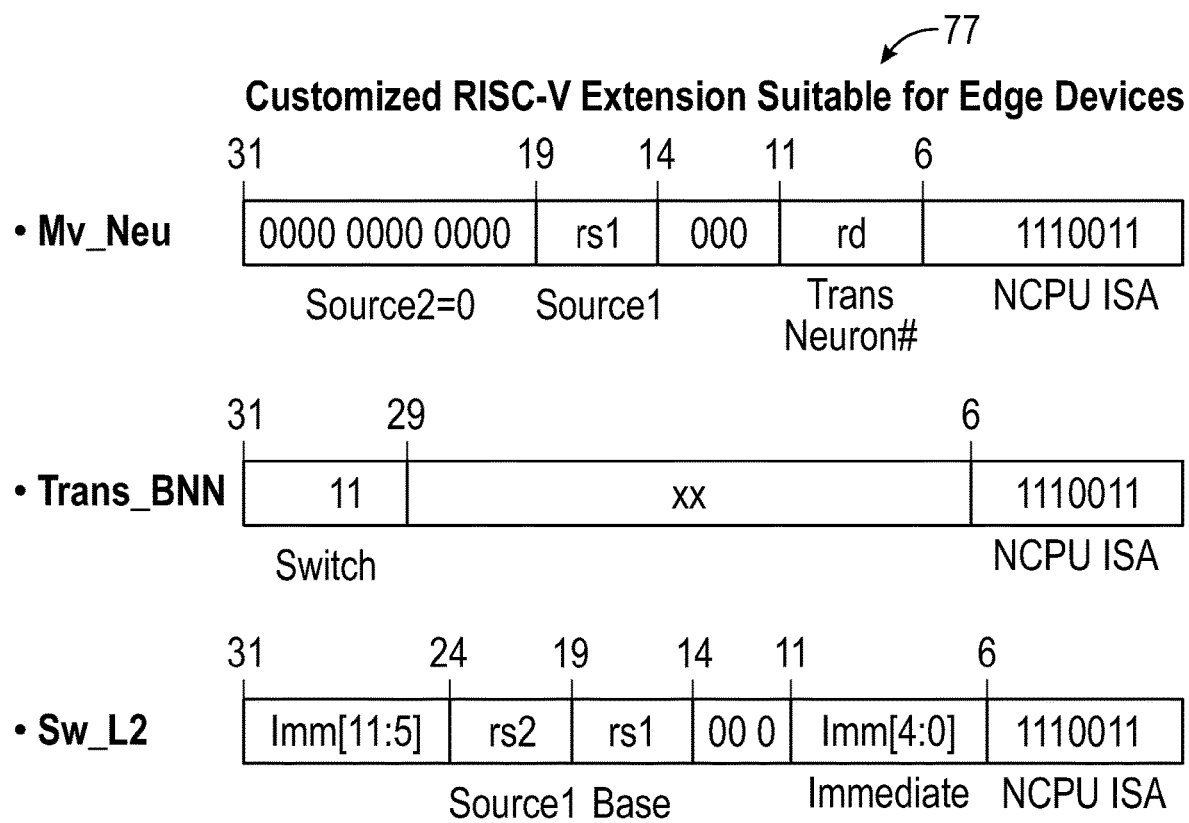
FIG. 5C illustrates an example customized RISC-V instruction extension to support the NCPU.

FIG. 5C illustrates an example customized RISC-V instruction extension to support the NCPU. RISC-V is an open-source hardware instruction set architecture based on the established reduced instruction set computer principles, which is highly suitable for ultra-low power embedded edge devices 77. In addition, it supports customized instruction extensions for special purposes. A series of customized instructions are developed and embedded inside the RISC-V ISA to support special NCPU operations and the mixed mode programming. In general, the last 7 bits of the instruction field are modified to indicate the customized NCPU instructions. Some example instructions of FIG. 5C are described below.

1.) Mv_Neu: move the designated register file values to the special design transition neuron located in each neural layer. The transition neurons are the configurations, e.g. model size, for the neural network operations.

2.) Trans_BNN: trigger the operation mode of the NCPU core from CPU mode to BNN mode. The instruction will send a special trigger signal to the bus controller, which contains the core mode state.

3.) Sw_L2: a special write through instruction for the data to be stored both at the local data cache and the global L2 memory.

4.) Trigger_BNN: a special instruction used to trigger the BNN accelerator core operation. This instruction is designed to operate as the conventional heterogeneous architecture for evaluation purpose.

In addition to the above example instruction extensions, there are several special transition neuron cells built at each neural layer to support temporal data storage for the operation mode switching. The instruction Mv_Neu can store the calculated configuration values e.g. run cycles of each neural network layer, to these transition neuron cells during CPU mode. After the operation mode switched to the BNN inference, the transition neuron values will be directly taken as the neural network configurations. This transition neuron cell design enables flexible management using CPU instructions for the following BNN operations.

Figure 6:
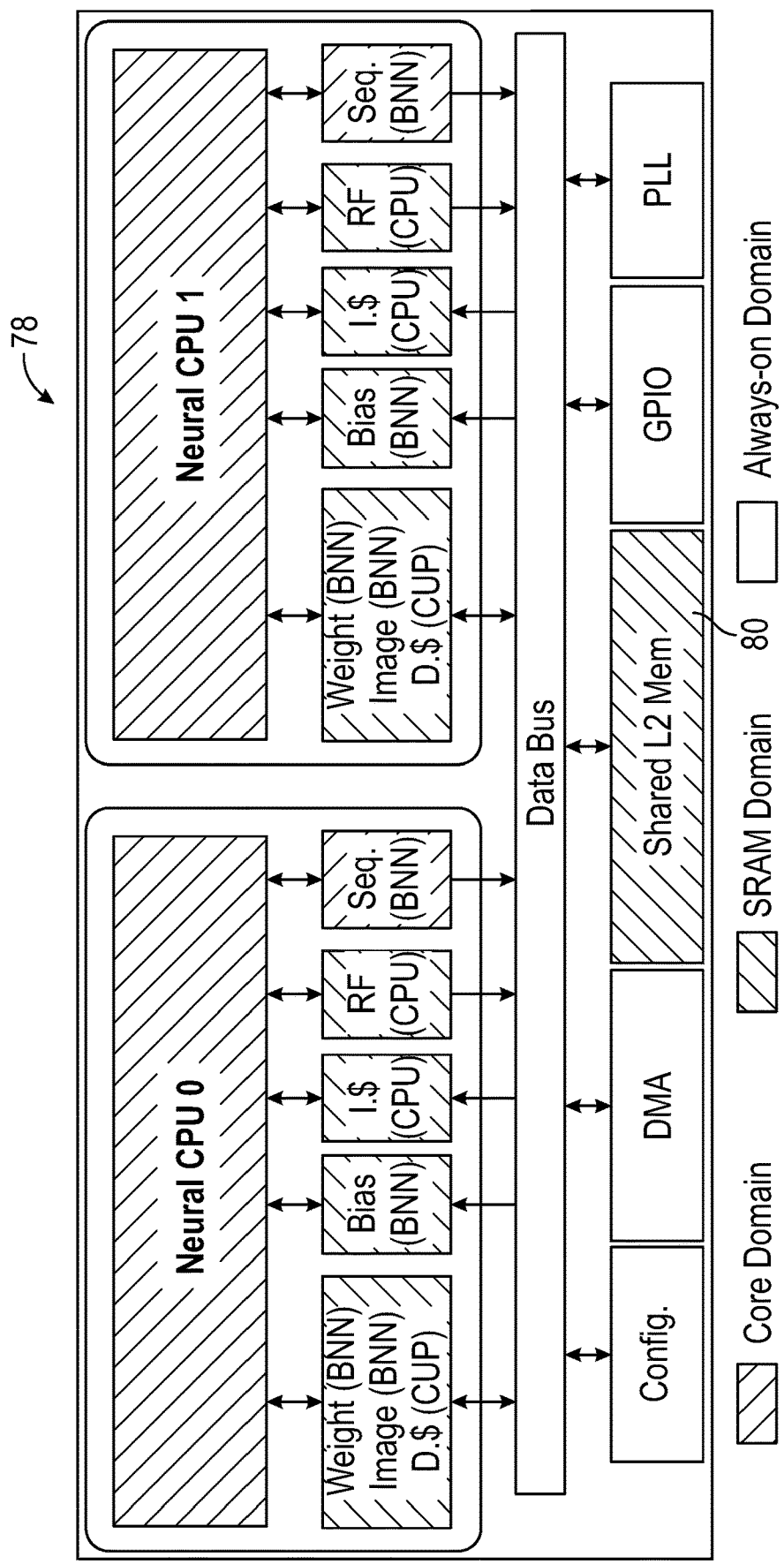
FIG. 6 illustrates an exemplary top-level SoC architecture of a two-core NCPU.

FIG. 6 illustrates an exemplary top-level SoC architecture 78 of a two-core NCPU in accordance with certain aspects of the disclosure. The NCPU architecture described above can efficiently merge the general-purpose CPU operations and the binary neural network accelerators with very small hardware overhead. Therefore, the NCPU is suitable for low power embedded applications. In addition, the NCPU architecture is also a good candidate to improve the SoC core utilization and the overall end-to-end performance of ML workload as it can be configured into both CPU and BNN. To demonstrate the benefits of both single-core and dual-core configurations, a two-core design of the NCPU as the top-level SoC architecture, shown in FIG. 6.

A global L2 memory 80 is shared by two NCPU core. Each core can access the L2 memory 80 by the customized RISC-V instruction following a simple write-through policy. A DMA engine is designed to manage the data communication between the NCPU cores and the L2 memory 80. During the workload operations, these two NCPU cores can operate independently for different workload tasks, e.g. CPU programs or classifying different images, or operate cooperatively, e.g. form a deeper neural network accelerator by connect these two NCPU cores in series based on the chip configurations. Such a design is implemented to make a comparison for two cases, (1) single NCPU with conventional CPU+BNN design for cost reduction, (2) two NCPU cores with conventional CPU+BNN design for end-to-end performance improvements.

Figure 7:
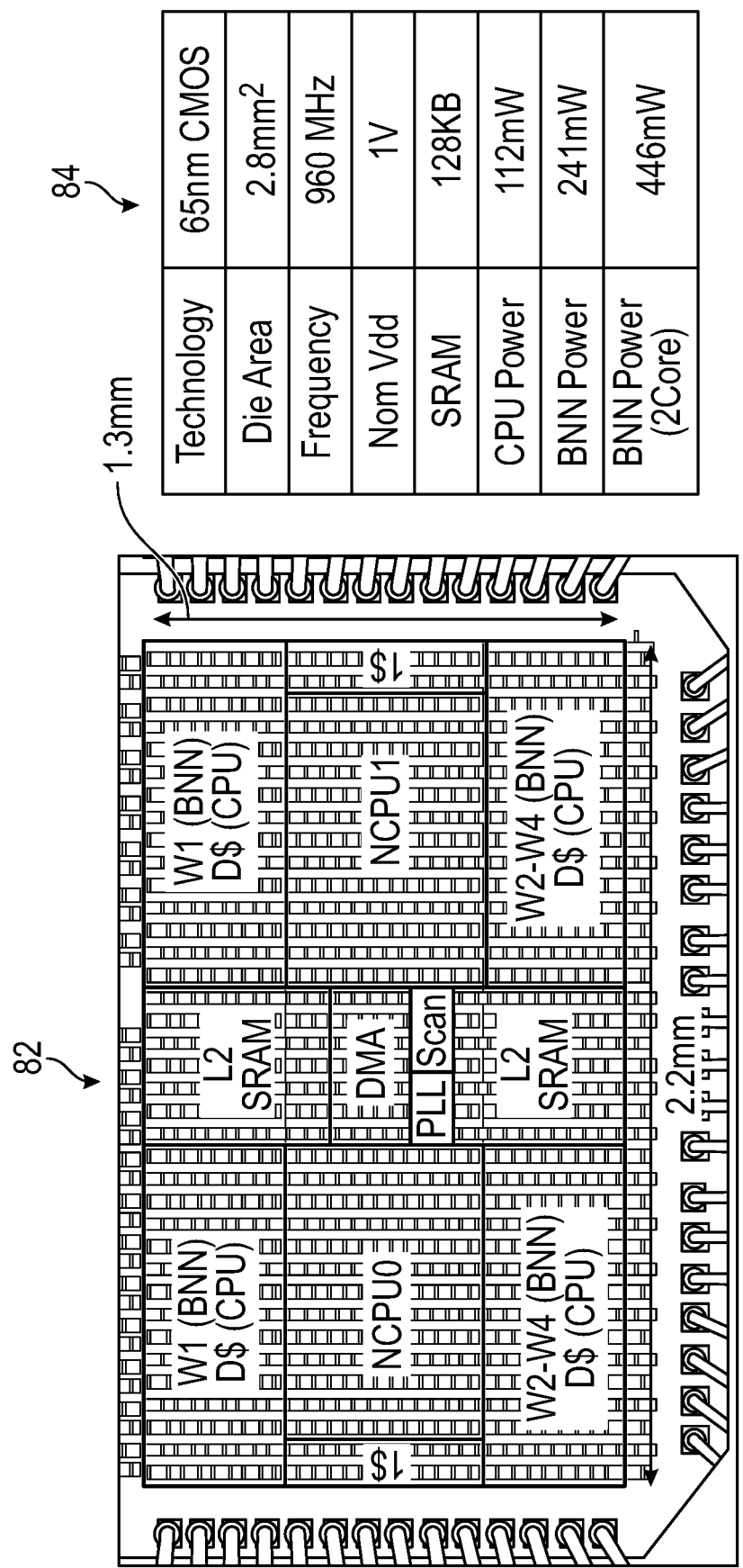
FIG. 7 illustrates a fabricated die photo and chip specifications of a two-core NCPU chip.

FIG. 7 illustrates a fabricated die photo 82 and chip specifications 84 of a two-core NCPU chip. In certain aspects, the two-core NCPU chip is designed and fabricated in TSMC 65 nm GP CMOS technology. Two identical NCPU cores, which each contains its own SRAM memory banks, are implemented on chip. The nominal operating frequency for the NCPU core, for example, is 960 MHz at 1V. The overall active die area, for example, is 2.86 mm$^2$.

Figure 8A:
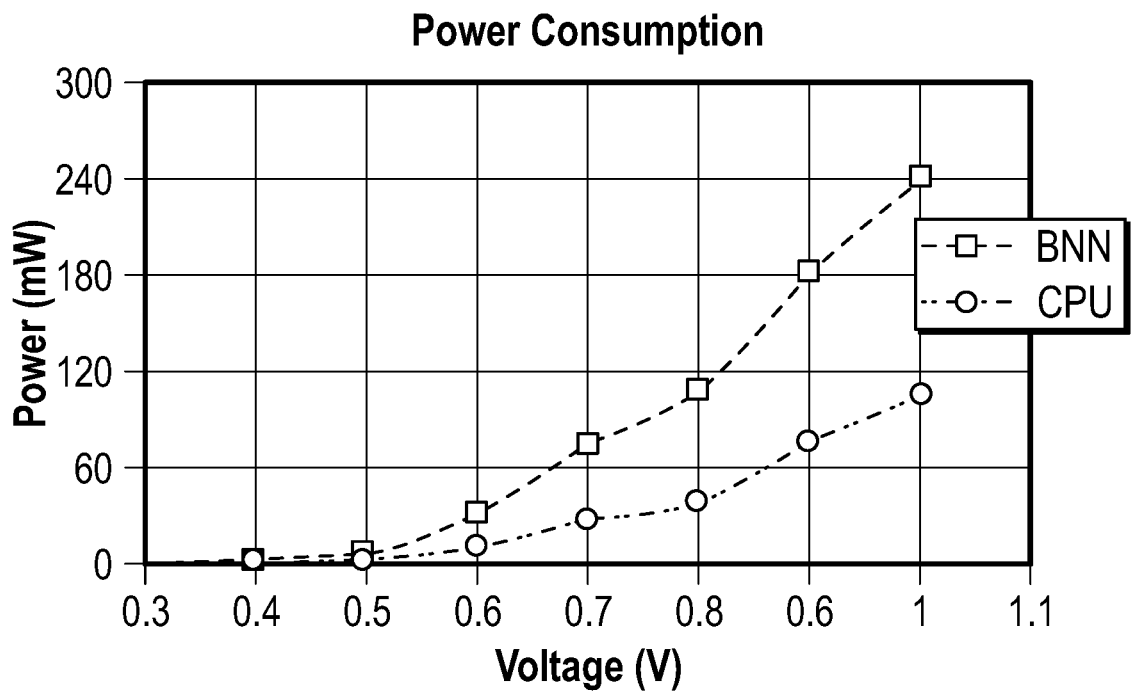
FIG. 8A illustrates a comparison of power consumption for the BNN accelerator mode and the CPU mode of the NCPU.
Figure 8B:
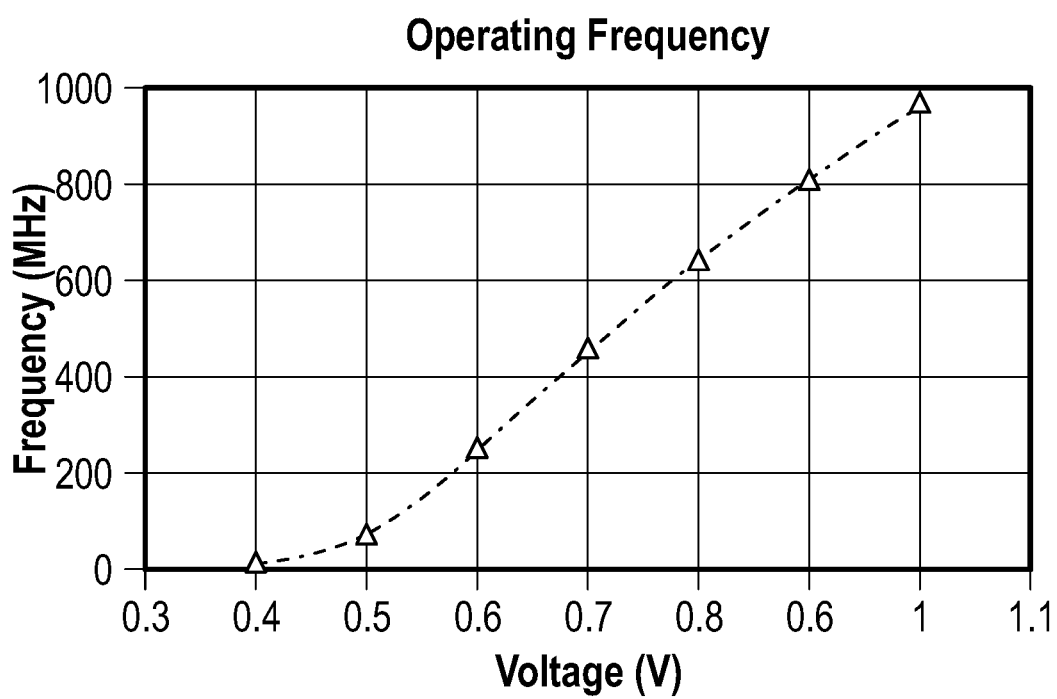
FIG. 8B illustrates operating frequency for the BNN accelerator mode and the CPU mode of the NCPU.
Figure 8C:
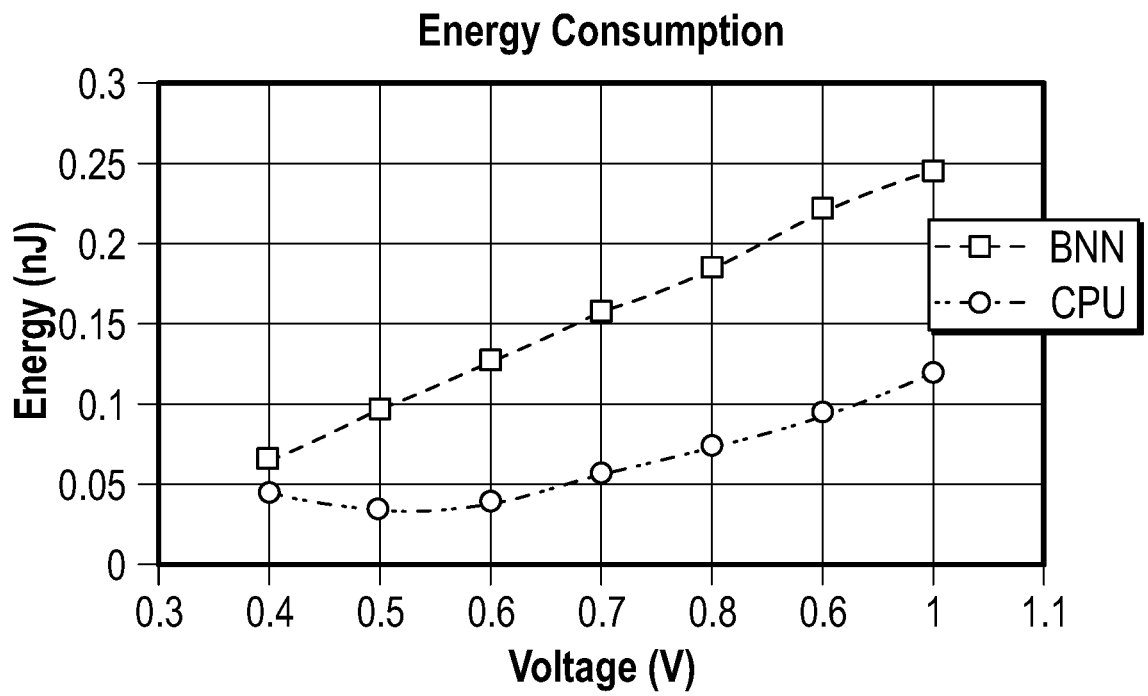
FIG. 8C illustrates a comparison of energy consumption for the BNN accelerator mode and the CPU mode of the NCPU.
Figure 8D:
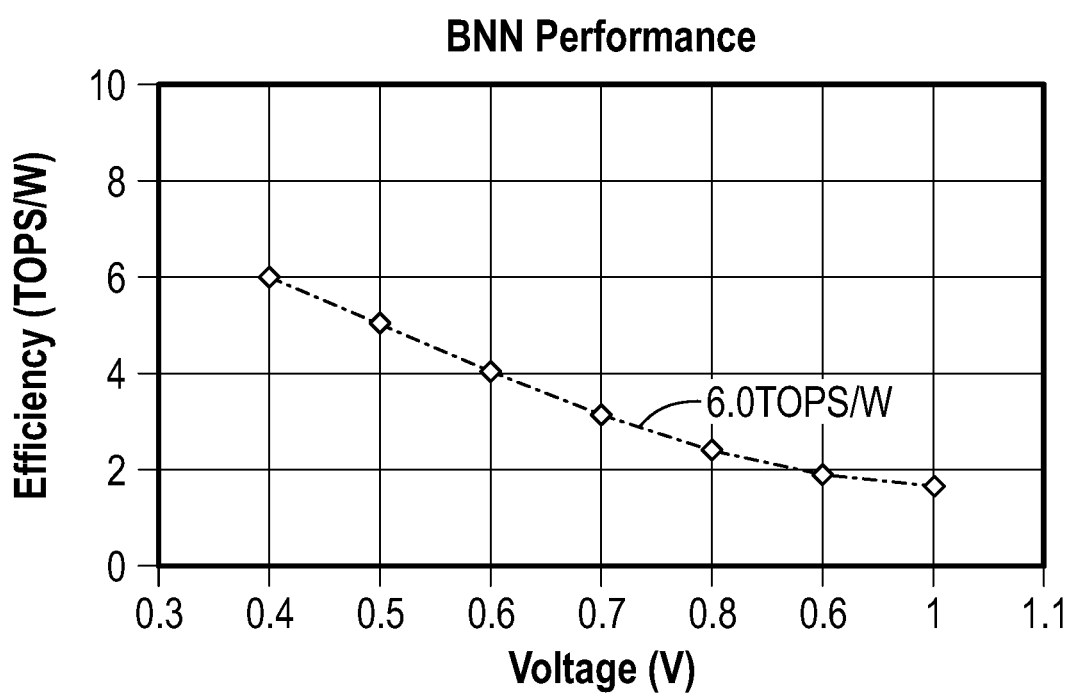
FIG. 8D illustrates power efficiency versus supply voltage for the BNN accelerator mode and the CPU mode of the NCPU.

FIG. 8A illustrates a comparison of power consumption for the BNN accelerator mode and the CPU mode of the NCPU. FIG. 8B illustrates operating frequency for the BNN accelerator mode and the CPU mode of the NCPU. FIG. 8C illustrates a comparison of energy consumption for the BNN accelerator mode and the CPU mode of the NCPU. FIG. 8D illustrates power efficiency versus supply voltage for the BNN accelerator mode and the CPU mode of the NCPU 22.

With reference to FIGS. 8A-8D, to apply NCPU design for ultra-low power applications, the chip performance and energy consumption for different modes is measured across a wide supply voltage range down to 0.4V. The chip functionality is verified by reading out all internal RF and memory after the operations. At 0.4V, the NCPU core can operate correctly at frequency 18 MHz, with the power consumption only 1.2 mW for BNN inference and 0.8 mW for CPU operations which is significantly lower than that in Intel's Mobius. The minimum energy point (MEP) for CPU mode is observed at 0.5V, with the leakage power dominating below that. Due to larger portion of dynamic power for the BNN inference, its MEP point is not observed before a malfunction is observed at below 0.4V. The computing efficiency for BNN across voltages is also measured showing 1.6 TOPS/W at 1V and a peak efficiency of 6.0 TOPS/W at voltage of 0.4V.

FIG. 9 illustrates a comparison between the NCPU core performance with conventional neural network accelerators. The conventional neural network accelerator [2] is the conventional heterogenous architecture which requires both the host ARM CPU and a specialized DNN accelerator to support the fully connected neural network. The conventional neural network accelerator [43] is adopting similar neuromorphic accelerator architecture using the fixed 8-bit data path. Comparing with the state-of-the-art standalone BNN accelerators [40] and [41], the NCPU achieves a compatible peak 6.0 TOPS/W power efficiency at 0.4V. In addition, the NCPU core can support the entire basic RISC-V instructions, which allows the elimination of the host CPU and enables a smooth mode switching and full core utilization as will be described later.

Figure 10A:
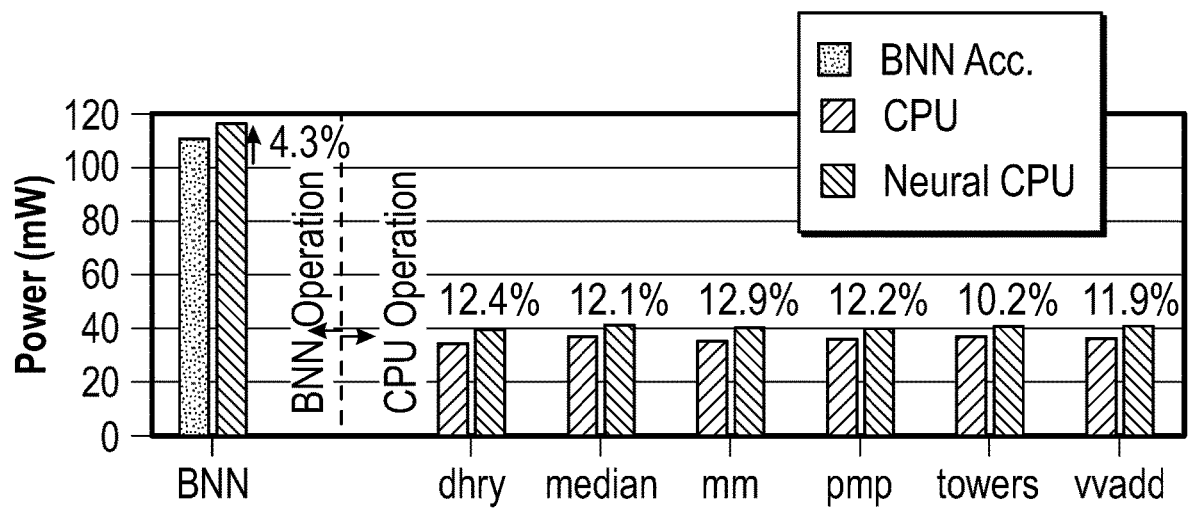
FIG. 10A illustrates a power consumption comparison for the BNN accelerator mode and the CPU mode of the NCPU.

FIG. 10A illustrates a power consumption comparison for the BNN accelerator mode and the CPU mode of the NCPU. To evaluate the design overhead for the NCPU, area, power, and speed are compared between the standalone RISC-V CPU, the BNN accelerator, and the NCPU core using final physical design netlist. As already discussed, the area overhead of the NCPU design is shown in FIG. 3B. Compared with the baseline standalone BNN accelerator, the area overhead of the NCPU design is only 2.7%. The performance, i.e. longest delay, is degraded by 4.1% and 5.2% compared with a standalone BNN accelerator or a CPU core. The power overhead evaluation is reported from dynamic power analysis by Prime Time based on cycle-by-cycle gate level simulation. The power consumption of the NCPU is compared with single standalone BNN accelerator, or a 5-stage RISC-V pipeline core design. During the BNN operation mode, the NCPU consumes 5.8% more power than the standalone BNN accelerator for MNIST dataset inference due to the extra inserted CPU logics. For the CPU operations, multiple embedded programs from the MiBench benchmark suite have been tested, which shows about 15% more power cost than a single CPU core.

Figure 10B:
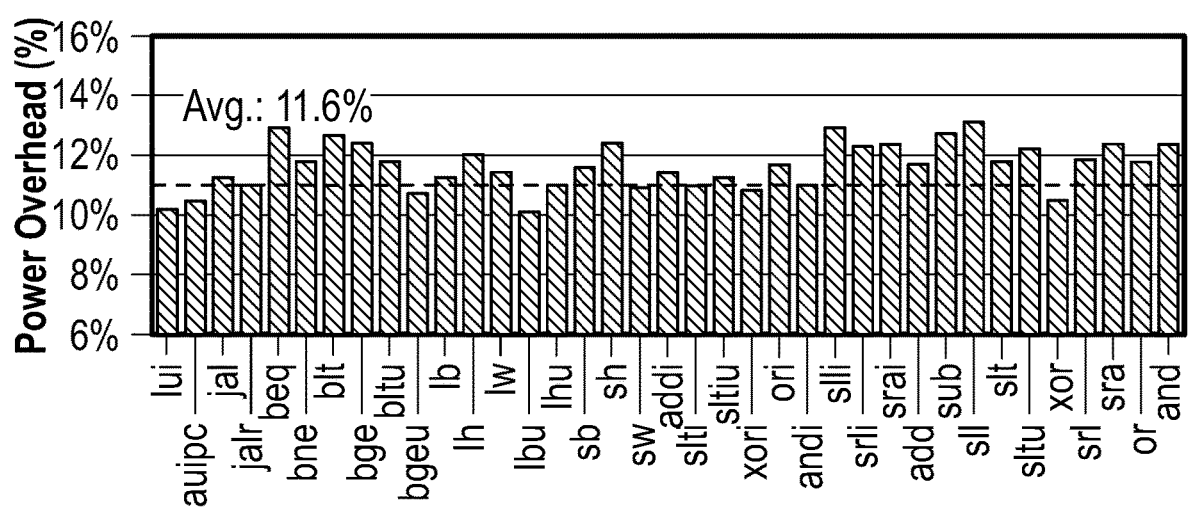
FIG. 10B illustrates power consumption overhead for supported instructions of the NCPU.

FIG. 10B illustrates power consumption overhead for supported instructions of the NCPU (e.g., the power consumption for all supported RISC-Vbase instructions individually). An average 14.7% more power is consumed for various instructions. The extra power cost mainly comes from the dynamic power of some ungated original logics inside each neuron cell.

Figure 11A:
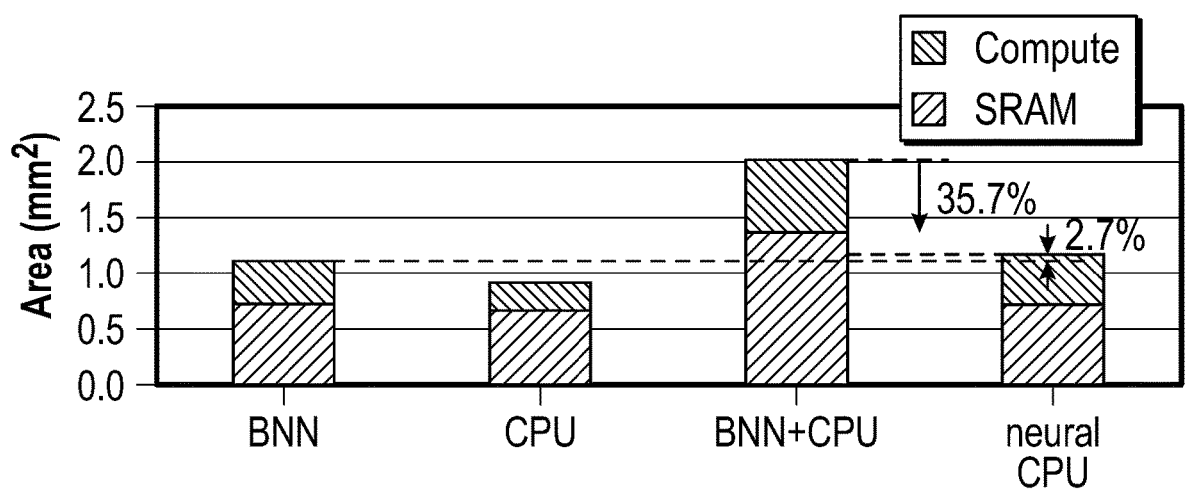
FIG. 11A illustrates area reduction comparisons for the NCPU, a standalone RISC-V CPU, a standalone baseline BNN accelerator, and a heterogeneous architecture including both CPU and BNN accelerator.
Figure 11B:
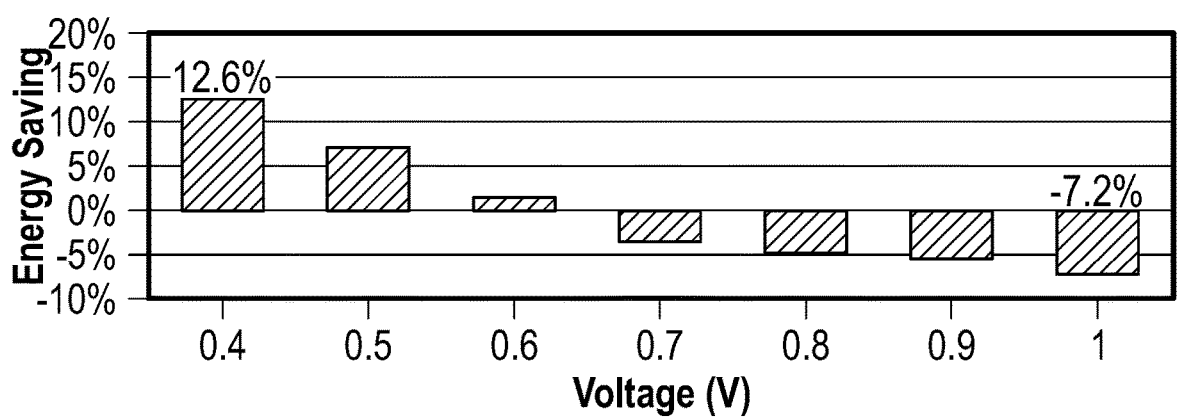
FIG. 11B illustrates energy saving benefit of the NCPU.

FIG. 11A illustrates area reduction comparisons for the NCPU, a standalone RISC-V CPU, a standalone baseline BNN accelerator, and a heterogeneous architecture including both CPU and BNN accelerator. FIG. 11B illustrates energy saving benefit of the NCPU. Although there are small hardware overheads between the NCPU and the standalone CPU or BNN core, the NCPU can achieve the area saving and energy reduction benefits when compared with the conventional heterogenous architecture. Compared with the heterogeneous architecture including both CPU and BNN accelerator, the reconfigurable NCPU architecture achieves 35.7% area reduction while maintaining the same functionalities. In addition, the energy saving benefit can be obtained by the NCPU core at the ultra-low voltage regime. As the leakage starts to dominate total energy consumption at ultra-low voltages, the area saving converts to the energy saving below 0.6 V and achieves 12.6% energy saving at 0.4V.

Overall, the NCPU architecture can efficiently merge two different architectures, i.e. CPU and BNN, into single core design, which achieves 35% area reduction and 12% energy saving at 0.4V, with only negligible performance degradation. In addition, the end-to-end performance has been significantly improved as described in below when compared with the conventional heterogeneous architecture.

Figure 12A:
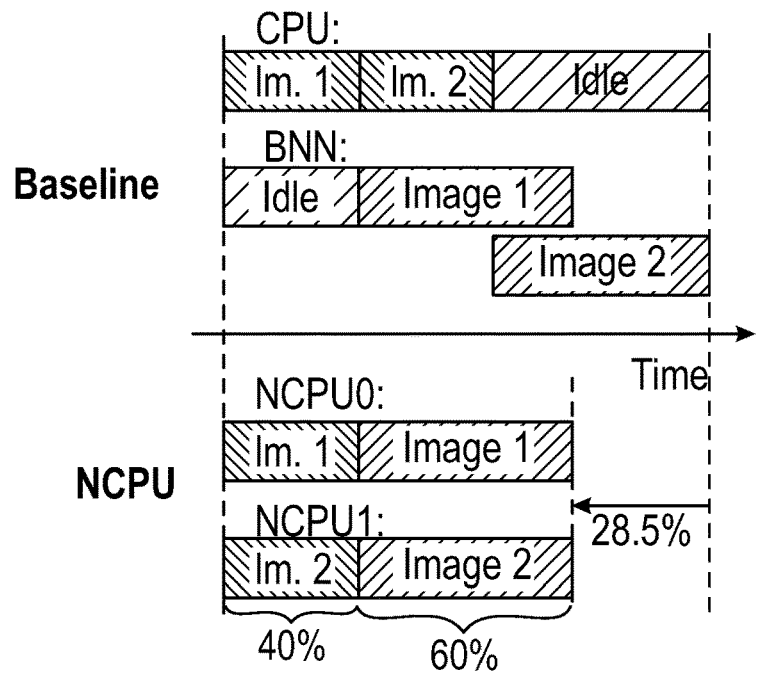
FIG. 12A illustrates end-to-end performance improvement of core utilizations during runtime under the CPU workload fraction of 40%.
Figure 12B:
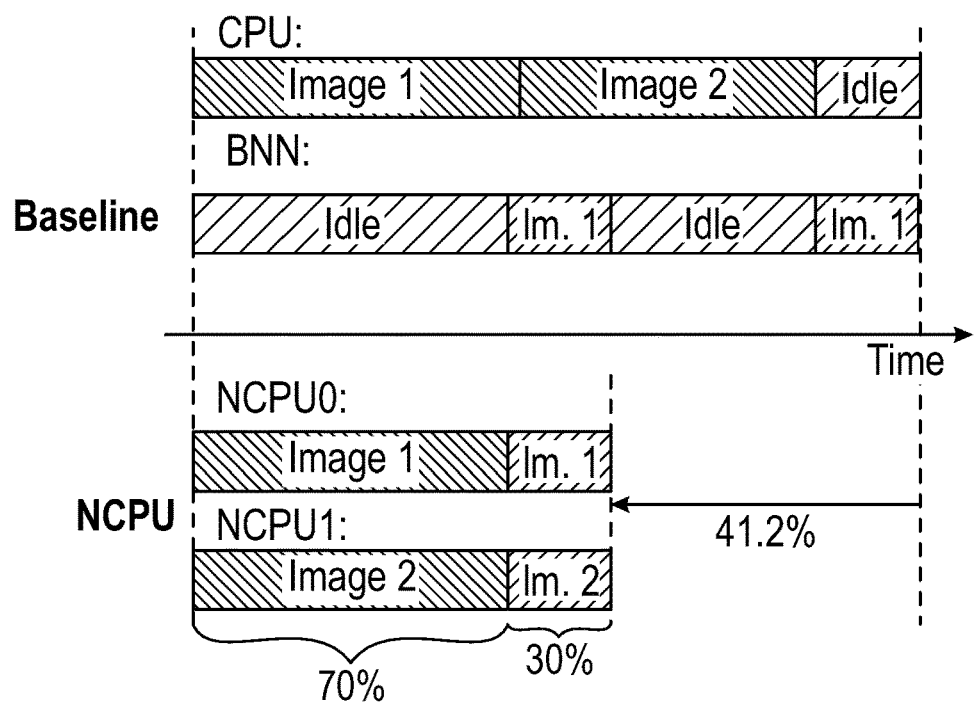
FIG. 12B illustrates end-to-end performance improvement of core utilizations during runtime under the CPU workload fraction of 70%.

FIG. 12A illustrates end-to-end performance improvement of core utilizations during runtime under the CPU workload fraction of 40% (e.g., for an image classification use case). FIG. 12B illustrates end-to-end performance improvement of core utilizations during runtime under the CPU workload fraction of 70%. The NCPU architecture can maintain core full utilization by smoothly switching the operation mode with zero-latency. Hence the workload end-to-end performance can be improved by eliminating any idle time for the cores. For example, the latency of the image BNN inference is maintained the same. The fraction of the CPU workload is adjusted by changing the complexity of the image data pre-processing algorithms. For the workload with a high fraction of CPU operations, e.g. 70%, the NCPU architecture improves the overall end-to-end performance by 41.2% compared with the baseline heterogenous architecture. For a well-balanced workload between CPU and BNN accelerator, e.g. CPU workload fraction of 40%, the NCPU still shows an improvement of 28.5%.

Figure 13:
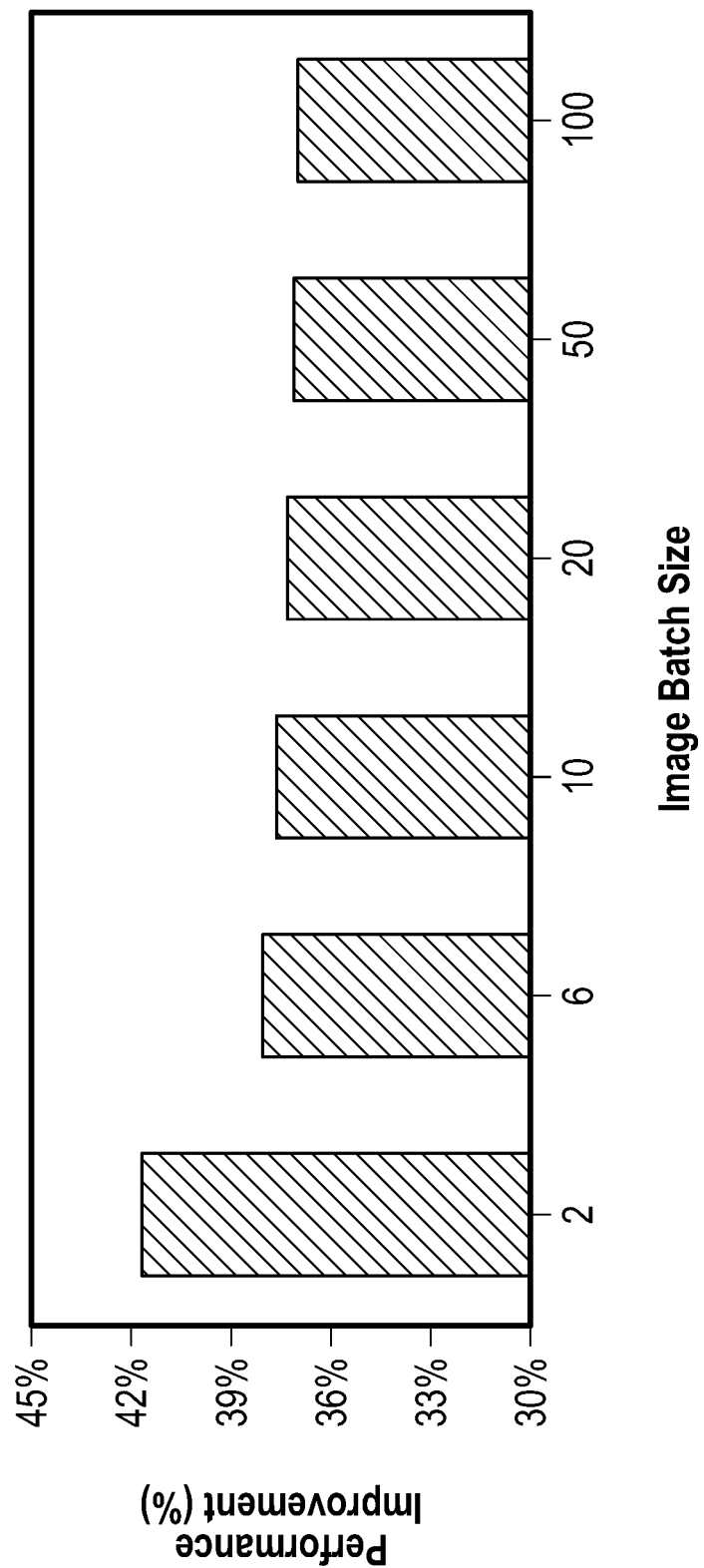
FIG. 13 illustrates end-to-end performance benefit with sweeping of image batch size under the CPU workload fraction of 70%.

FIG. 13 illustrates end-to-end performance benefit with sweeping of image batch size under the CPU workload fraction of 70%. Larger batch size helps the conventional heterogenous architecture to hide the data transfer latency and obtain higher end-to-end performance. Therefore, the NCPU will gain a little less end-to-end benefit with larger image batch size while still maintaining above 37% latency improvement with the batch size of 100.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A system, comprising:
a memory;
a first layer in communication with the memory;
an instruction cache in communication with the first layer;
a second layer in communication with the first layer;
a register file in communication with the first layer and the second layer;
a third layer in communication with the first layer, the second layer, and the memory;
a fourth layer in communication with the third layer, the register file, and the memory; and
a result memory in communication with the fourth layer,
wherein, in a binary neural network accelerator mode, the memory is configured as an image memory and weight memories,
wherein, in a central processing unit mode, the memory is reconfigured, from the image memory and the weight memories, to a data cache.

2. The system of claim 1, wherein the first layer comprises a plurality of XNOR neuron cells.

3. The system of claim 1, wherein the first layer comprises a 32-bit adder.

4. The system of claim 3, wherein the 32-bit adder is based on a RISC-V 32-bit base integer instruction set.

5. The system of claim 1, wherein a portion of the first layer is configured as a program counter.

6. The system of claim 1, wherein a portion of the first layer is configured to fetch instructions.

7. The system of claim 1, wherein the second layer is configured to decode instructions into partial codes.

8. The system of claim 1, wherein the third layer is configured to perform as an arithmetic logic unit.

9. The system of claim 1, wherein the fourth layer is configured to read data from the data cache and to write data to the data cache.

10. The system of claim 1, wherein transitioning between the binary neural network accelerator mode and central processing unit mode switches at zero-latency.

11. An edge device, comprising:
a memory; and
a neural central processing unit in communication with the memory,
wherein the neural central processing unit is configured to transition between a binary neural network accelerator mode and a central processing unit mode,
wherein, in the binary neural network accelerator mode, the memory is configured as an image memory and weight memories,
wherein, in the central processing unit mode, the memory is reconfigured, from the image memory and the weight memories, to a data cache.

12. The edge device of claim 11, wherein the neural central processing unit comprises a first layer comprising a plurality of XNOR neuron cells.

13. The edge device of claim 12, wherein the first layer comprises a 32-bit adder.

14. The edge device of claim 13, wherein the 32-bit adder is based on a RISC-V 32-bit base integer instruction set.

15. The edge device of claim 12, wherein a portion of the first layer is configured as a program counter.

16. The edge device of claim 12, wherein a portion of the first layer is configured to fetch instructions.

17. The edge device of claim 11, wherein the neural central processing unit comprises a second layer configured to decode instructions into partial codes.

18. The edge device of claim 11, wherein the neural central processing unit comprises a third layer configured to perform as an arithmetic logic unit.

19. The edge device of claim 11, wherein the neural central processing unit comprises a fourth layer configured to read data from a data cache of the neural central processing unit and to write data to the data cache of the neural central processing unit.

20. The edge device of claim 11, wherein transitioning between the binary neural network accelerator mode and central processing unit mode switches at zero-latency.

\* \* \* \* \*